US009135273B2

United States Patent
Hirai et al.

(10) Patent No.: US 9,135,273 B2
(45) Date of Patent: Sep. 15, 2015

(54) SIMILAR IMAGE SEARCH SYSTEM

(71) Applicant: Hitachi Kokusai Electric Inc., Tokyo (JP)

(72) Inventors: Seiichi Hirai, Tokyo (JP); Shinya Ogura, Tokyo (JP); Naoyuki Shimbo, Tokyo (JP); Hiroto Nagayoshi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/402,721

(22) PCT Filed: May 24, 2013

(86) PCT No.: PCT/JP2013/064508
§ 371 (c)(1),
(2) Date: Nov. 21, 2014

(87) PCT Pub. No.: WO2013/172636
PCT Pub. Date: Nov. 28, 2013

(65) Prior Publication Data
US 2015/0112970 A1 Apr. 23, 2015

(30) Foreign Application Priority Data

May 24, 2012 (JP) ................................. 2012-118152

(51) Int. Cl.
G06K 9/00 (2006.01)
G06F 17/30 (2006.01)
G06T 7/00 (2006.01)

(52) U.S. Cl.
CPC ...... *G06F 17/30256* (2013.01); *G06K 9/00221* (2013.01); *G06K 9/00228* (2013.01);
(Continued)

(58) Field of Classification Search
CPC .................... G06F 17/30256; G06K 9/00228; G06K 9/00268
USPC ......................................... 382/278, 115, 118
See application file for complete search history.

(56) References Cited

U.S. PATENT DOCUMENTS

2006/0093183 A1* 5/2006 Hosoi ........................... 382/103
2009/0196467 A1* 8/2009 Okubo ......................... 382/118

FOREIGN PATENT DOCUMENTS

JP 2004-94491 A 3/2004
JP 2007-316809 A 12/2007
(Continued)

OTHER PUBLICATIONS

Atsushi Hiroike et al., Visualization Models for Large Image Sets, Journal of the Society of Society of Photographic Science and Technology of Japan, vol. 66, No. 1, pp. 93-101.
(Continued)

*Primary Examiner* — Ruiping Li
(74) *Attorney, Agent, or Firm* — Brundidge & Stanger, P.C.

(57) ABSTRACT

Disclosed is a similar facial image search system which is less susceptible to bias in search results even when there is a difference in the angle from which a face is photographed. The present invention is provided with: a means for detecting a first face from the inputted search subject image; a means for calculating and a means for recording a feature value of the detected first face; a means for detecting a second face from an inputted key image used for search; a means for calculating the face angle of the second face; a means for determining a synthesis pattern from the calculated face angle; a means for generating a synthetic face image according to the determined synthesis pattern; a means for calculating the feature value of the second face using the generated synthetic face image; a means for searching a database using a plurality of calculated face feature values as a query; and a means for integrating the plurality of the retrieved search results.

4 Claims, 16 Drawing Sheets

(52) U.S. Cl.
CPC ........ *G06K9/00268* (2013.01); *G06K 9/00288* (2013.01); *G06T 7/004* (2013.01); *G06T 2207/30201* (2013.01)

(56) References Cited

FOREIGN PATENT DOCUMENTS

| JP | 2008-217220 A | 9/2008 |
| JP | 2009-43065 A | 2/2009 |
| JP | 4653606 B2 | 3/2011 |
| JP | 2012-48550 A | 3/2012 |
| JP | 2012-221148 A | 11/2012 |

OTHER PUBLICATIONS

English Translation of Written Opinion of International Searching Authority (PCT/ISA/237).

* cited by examiner

FIG. 8
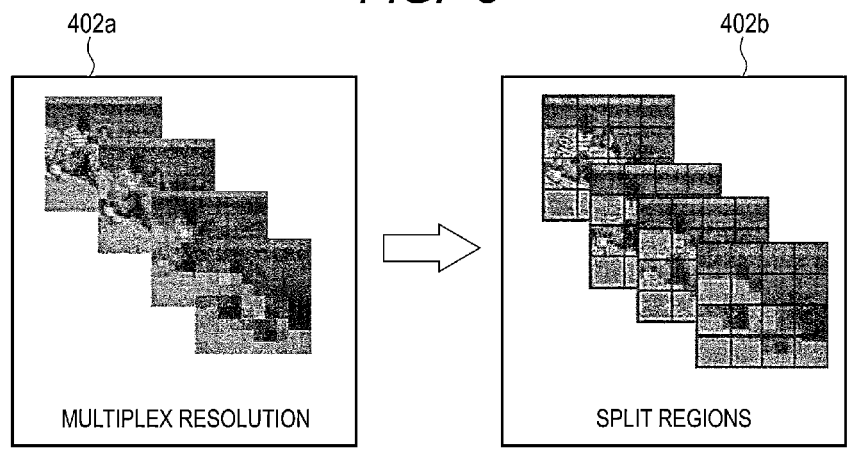
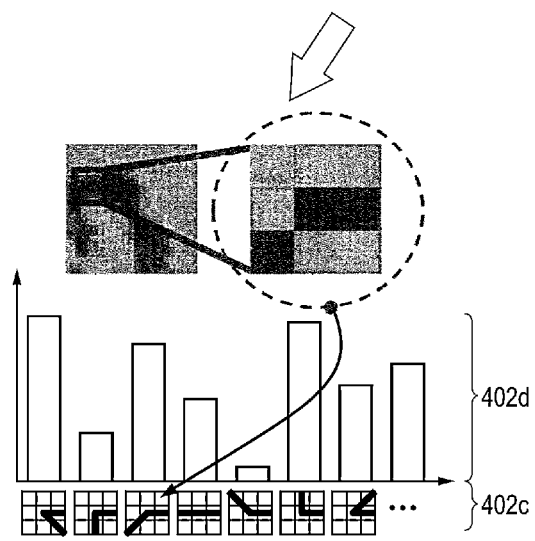

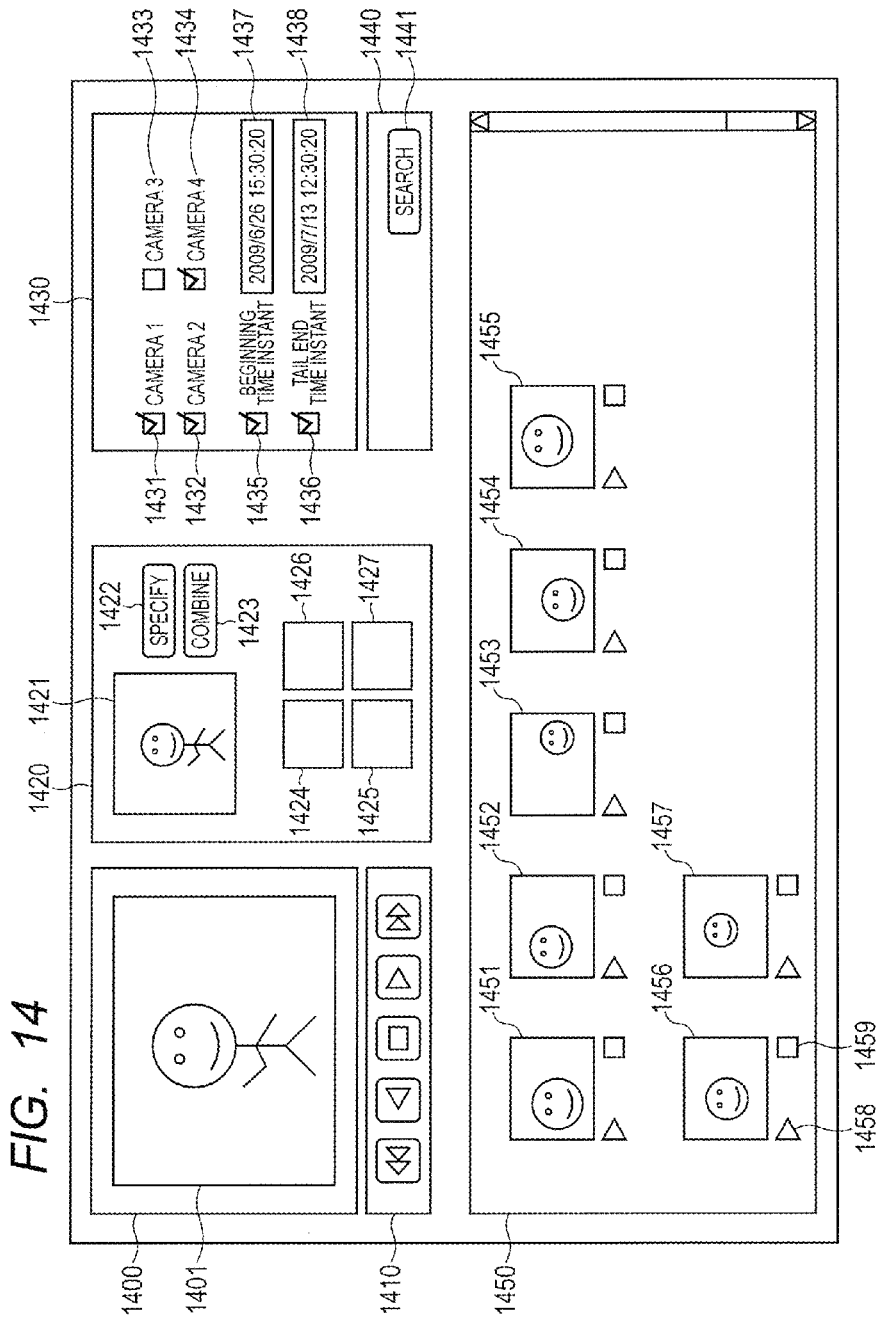

SIMILAR IMAGE SEARCH SYSTEM

TECHNICAL FIELD

The present invention relates to a video monitoring system, and more specifically to a similar image retrieval system that retrieves images using an image feature value.

BACKGROUND ART

Heretofore, a video monitoring system is installed in facilities such as hotels, buildings, convenience stores, financial institutions, dams, and roads, on which an unspecified large number of people visit, in order to suppress crimes, prevent accidents, and so on. Such a video monitoring system is a system in which a person who is a target for surveillance, for example, is shot using an imaging apparatus such as a camera, the shot picture is transmitted to a monitoring center such as a management office or a security office, and a permanently stationed guard monitors the picture, and calls attention or records the picture depending on purposes or as necessary.

In recording pictures in the video monitoring system, such cases are increasing in which a random access medium typified by a hard disk drive (HDD) is used for a recording medium instead of a conventional video tape medium. Moreover, in these years, an increase in the capacity of the recording medium is advancing. The volume of recordable pictures is dramatically increasing because of an increase in the capacity of the recording medium, and recording at many points and recording for a long time are being enabled. On the other hand, it is beginning to come to the surface as a problem in that a burden is increased to visually check recorded images.

Because of such a background, a video monitoring system is becoming popular, which includes a retrieval function for more easily finding a desired picture. More specifically in these years, a system including a more sophisticated retrieval function is coming in which the occurrence of a specific event in pictures is automatically detected in real time using an image recognition technique, the event is recorded together with a picture, and the event can be retrieved afterward. One of typical systems is a similar face image retrieval system including a similar face image retrieval function.

The similar face image retrieval function is a function that can retrieve a person entering a surveillance picture as an event and retrieves the appearance of a particular individual specified by a user in the event using the image feature value of the face.

FIG. 1 is a diagram of an exemplary configuration of a video monitoring system including a previously existing similar face image retrieval function. In the following, "the video monitoring system including the similar face image retrieval function" is referred to as "a similar image retrieval system". The system illustrated in FIG. 1 is configured in which an imaging apparatus 101, a recording apparatus 102, a retrieval apparatus 103, and a terminal device 104 are connected to a network 150 in the state in which the apparatuses and the device can communicate with one another.

The network 150 is a communication line such as an exclusive line, an intranet, the Internet, and a wireless LAN (Local Area Network) that connects the apparatuses and the device to one another for data communication.

The imaging apparatus 101 is a device such as a network camera and a surveillance camera that takes an image using a device such as a CCD (Charge Coupled Device) and a CMOS (Complementary Metal Oxide Semiconductor), subjects the image to picture processing such as white balance to generate image data, and outputs the image data to the network 150.

The recording apparatus 102 is a device such as a network digital recorder that records the image data inputted through the network 150 on a recording medium such as a HDD and outputs the image data recorded on the recording medium to the network 150 in response to a request from an external device.

The retrieval apparatus 103 is a device such as a server and a PC (Personal Computer) that detects a face in the image data inputted through the network 150, records information about the face on a recording medium such as a HDD, searches for information about the face recorded on the recording medium in response to a request from an external device, and outputs the search result to the network 150.

The terminal device 104 is a device such as a desktop PC that displays the image data and the search result inputted through the network 150 on the screen of a monitor such as a liquid crystal display and a CRT (Cathode Ray Tube), includes a keyboard, a mouse, and the like, and provides a manipulation interface for the manipulation of reproduction of recorded images and the manipulation of searching for a person.

An example of the configuration and processing operation of the previously existing retrieval apparatus 103 will be described with reference to FIG. 2. FIG. 2 is a diagram of an exemplary configuration of the previously existing retrieval apparatus 103. The retrieval apparatus 103 is configured of a face registration processing group 221, a face retrieval processing group 222, and a face feature value database 205.

The face registration processing group 221 is configured of an image input unit 201, a face detecting unit 202, a face feature value calculating unit 203, and a face feature value recording unit 204. Moreover, the face retrieval processing group 222 is configured of an image input unit 211, a face detecting unit 212, a face feature value calculating unit 213, a face feature value searching unit 214, and a search result output unit 215.

In FIG. 2, in the process at the face registration processing group 221, the image input unit 201 performs a process for receiving surveillance image data inputted from the imaging apparatus 101 and the recording apparatus 102. The surveillance image data, that is, the image data of a search target image is inputted constantly, or separately at a time when an instruction is made, or when a setting is established. The image input unit 201 outputs the inputted image data to the face detecting unit 202.

The face detecting unit 202 performs a process for detecting a face from the image data inputted from the image input unit 201 and outputting the face detection result. Here, the face detection result means information about the presence or absence of a face in the image. In the case where a face exists, the face detection result also includes the number of faces detected, the position coordinates of a face region in the image, a face image, and so on. A face is detected by an image recognition technique such as a method for searching the inside of an image using the characteristics of a face such as the disposition of main components of a face including eyes, a nose, and a mouth and the difference in shades between the forehead and the eyes, for example. Any methods may be used in this example. The face image means an image cut in a rectangular shape including a face out of the image data from the image input unit 201 and having an aspect ratio. Desirably, the background other than a face is filled in a predetermined color. The face detecting unit 202 outputs the face detection result to the face feature value calculating unit 203.

The face feature value calculating unit 203 performs a process for calculating the feature value of the face using the face image included in the face detection result inputted from the face detecting unit 202 and outputting the calculated face feature value. Here, the face feature value means vectors, including the frequency distribution of the outlines or edge patterns of fragmented faces, the size and shape of the main components of the face such as eyes, a nose, and a mouth, the relationship of the disposition between the main components, the color distribution of hairs and the skin, and the combination of them, for example. Any types and any numbers of components may be used for the feature value.

For the calculation process for the face feature value, the methods disclosed in Patent Literature 3 and Non-patent Literature 1 are used, for example. The face feature value calculating unit 203 repeats processing according to the number of faces detected in the inputted face detection result. The face feature value calculating unit 203 outputs the calculated face feature value to the face feature value recording unit 204 together with the face detection result.

The face feature value recording unit 204 performs a process for writing the image data, the face detection result, and the face feature values inputted from the face feature value calculating unit 203 on the face feature value database 205. The processing unit repeats processing according to the number of faces detected in the inputted face detection result.

Subsequently, in the process at the face retrieval processing group 222, the image input unit 211 receives search key image data inputted from the terminal device 104. The image input unit 211 receives the input of the search key image data in the case where a request for search is made based on a search instruction manipulation made by a user on the terminal device 104. The image input unit 211 outputs the inputted image data to the face detecting unit 212.

The face detecting unit 212 detects a face from the image data inputted from the image input unit 211. The face detection result calculated at the face detecting unit 212 and the calculating method are information about the presence or absence of a face in the image similarly to the face detection result calculated at the face detecting unit 202. The face detecting unit 212 outputs the calculated face detection result to the face feature value calculating unit 213 together with the image data.

The face feature value calculating unit 213 performs a process for calculating the feature value of the face by the same method as the face feature value calculating unit 203 using the face image included in the face detection result inputted from the face detecting unit 212, and outputs the calculated face feature value. The face feature value calculating unit 213 outputs the calculated face feature value to the face feature value searching unit 214 together with the image data and the face detection result.

The face feature value searching unit 214 checks the face feature value inputted from the face feature value calculating unit 213 against the face feature value database 205, makes a list of faces with higher face similarities, and outputs the list as the search result. The face similarity means a numeric value that expresses the proximity between face feature values. In the case where a Euclidean distance in a multi-dimensional face feature value space is used for face similarity, for example, the similarity means that a smaller value of similarity (a value closer to zero) has a higher similarity, and this is expressed as "a high similarity". The face feature value searching unit 214 outputs the search result to the search result output unit 215. This search result includes the face feature value of the found face, the similarity, the image data, and so on.

The search result output unit 215 outputs the search result inputted from the face feature value searching unit 214 to the terminal device 104.

Techniques for the calculation process for the face feature value are described also in Patent Literature 1 and Patent Literature 2, for example, in addition to Non-patent Literature 1 described above.

CITATION LIST

Patent Literatures

Patent Literature 1: Japanese Unexamined Patent Application Publication No. 2009-43065
Patent Literature 2: Japanese Patent No. 4653606
Patent Literature 3: Japanese Patent No. 2012-221148
Patent Literature 4: Japanese Patent No. 2008-217220

Non-Patent Literature

Non-patent Literature 1: HIROIKE Atsushi, et al., "Visualization Models for Large Image Sets", Journal of the Society of Photographic Science and Technology of Japan, Vol. 66, No. 1, P 93-P 101

SUMMARY OF INVENTION

Technical Problem

The similar face image retrieval function described above is very useful for the purpose of searching a huge volume of pictures recorded on a recording apparatus or the like for the pictures of a particular individual. However, in similar face image retrieval under the present circumstances, since image feature values used are affected by apparent face angles such as differences in shot angles and the orientations of a face at shot time instants, the image feature value distribution of a single person is spread, and the distribution is biased. As a result, it is likely that the search result to be outputted is also biased.

In other words, in the case where a face image that a face is taken from the front side is used for a search key image, recorded images found as search results include many front face images, and similarly in the case where a face image that a face is obliquely taken is used for a search key image, recorded images found as search results include many oblique face images taken at similar angles. In other words, when a front face image is used for a search key image, it is highly likely that oblique face images of the same person fail to be found, and vise versa. Moreover, on the contrary, this case sometimes happens where a person who is actually a different person is determined as the person him or herself of a key image, which degrades retrieval accuracy, that is, the ratio of the search result including the person him or herself.

The relationship between a person and the imaging apparatus in the similar face image retrieval system is the relationship that the person is not aware of the imaging apparatus, which is different from a typical face authentication system used for opening and closing doors. Therefore, shot faces are often taken at a more variety of angles, and it is indispensable to solve the problems.

The present invention is made from the viewpoint of the situations, and it is an object to provide a more highly accurate similar image retrieval system that solves the problems.

Solution to Problems

In order to achieve the object, a similar image retrieval system according to a first aspect of the present invention includes: a first image input unit configured to receive an input of a search target image; a first face detecting unit configured to detect a first face from the inputted search target image; a face feature value calculating unit configured to calculate a feature value of the detected first face; a database recording unit configured to record the calculated face feature value; a second image input unit configured to receive an input of a key image for search; a second face detecting unit configured to detect a second face from the inputted key image; a face angle calculating unit configured to calculate a face angle of the detected second face; a combined pattern determining unit configured to determine a combined pattern by the calculated face angle; a combined face generating unit configured to generate a combined face image according to the determined combined pattern; a second face feature value calculating unit configured to calculate a feature value of the second face using the generated combined face image; a face feature value searching unit configured to repeat the combined face generating unit and the face feature value calculating unit according to a number of the determined combined patterns and search a database using a plurality of calculated face feature values as queries; and a search result integrating unit configured to integrate a plurality of retrieved search results.

Moreover, in order to achieve the object, a similar image retrieval system according to a second aspect of the present invention includes: a first image input unit configured to receive an input of a search target image; a first face detecting unit configured to detect a first face from the inputted search target image; a first face angle calculating unit configured to calculate a face angle of the detected first face; a first face feature value calculating unit configured to calculate a feature value of the detected first face; a record destination database determining unit configured to determine a record destination database according to the calculated face angle; a database recording unit configured to record the calculated first face feature value on the determined record destination database; a second image input unit configured to receive an input of a key image for search; a second face detecting unit configured to detect a second face from the inputted key image; a face angle calculating unit configured to calculate a face angle of the detected second face; a combined pattern determining unit configured to determine a combined pattern by the calculated face angle; a combined face generating unit configured to generate a combined face image according to the determined combined pattern; a second face feature value calculating unit configured to calculate a feature value of the second face using the generated combined face image; a search target database determining unit configured to determine a search target database by the calculated face angle; a face feature value searching unit configured to perform the combined face generating unit, the second face feature value calculating unit, and the search target database determining unit for a plurality of times according to a number of the determined combined patterns and search the database using a plurality of calculated face feature values as queries; and a search result integrating unit configured to integrate a plurality of retrieved search results.

In the similar image retrieval system according to the second aspect of the present invention, a third aspect of the present invention is in which the face angle calculating unit includes a face angle feature value calculating unit for an inputted face; a database that in advance stores a face angle feature value for a face at a known angle together with face angle information; and a face angle searching unit configured to search the database using a face angle feature value determined at the face angle feature value calculating unit as a query.

Moreover, in the similar image retrieval system according to the second aspect of the present invention, a fourth aspect of the present invention is in which the combined pattern determining unit uses a probability that is a calculated result at the face angle calculating unit, and also uses a face angle having a probability of a second candidate or later one.

Advantageous Effects of Invention

According to the present invention, it is possible to architect a similar image retrieval system of improved retrieval accuracy and reliability.

BRIEF DESCRIPTION OF THE DRAWINGS

FIG. 8 is a calculating method for a face feature value according to Patent Literature 1 used by a face feature value calculating unit 203.

FIG. 14 is an exemplary screen displayed on a terminal device according to the third embodiment.

DESCRIPTION OF EMBODIMENTS

Figure 1:
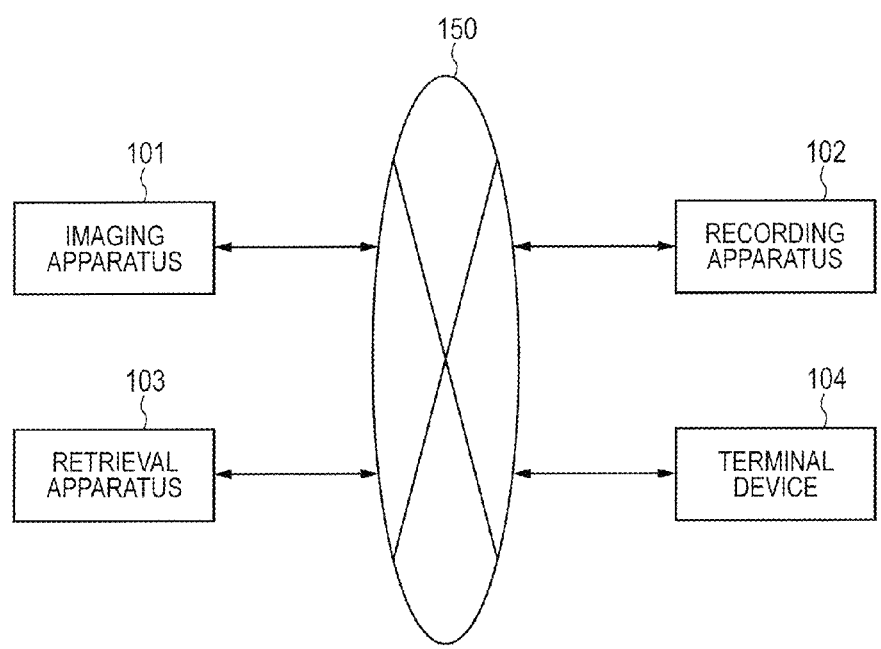
FIG. 1 is an exemplary configuration of a previously existing similar face image retrieval system.

In the following, embodiments of the present invention will be described with reference to the drawings and the like. It is noted that the following description is made for explaining the embodiments of the present invention, and does not limit the scope of the invention of the present application. Therefore, a person skilled in the art will be able to adopt embodiments that the components or all the components of the embodiments of the present invention are replaced by the equivalent of the components, and these embodiments are also included in the scope of the invention of the present application. It is noted that in the description of the drawings including FIGS. 1 and 2 described as the previously existing technique, the components having the same functions are designated the same reference numbers, and redundant description is omitted.

First Embodiment

In the following, a first embodiment of the present invention will be described.

Figure 3:
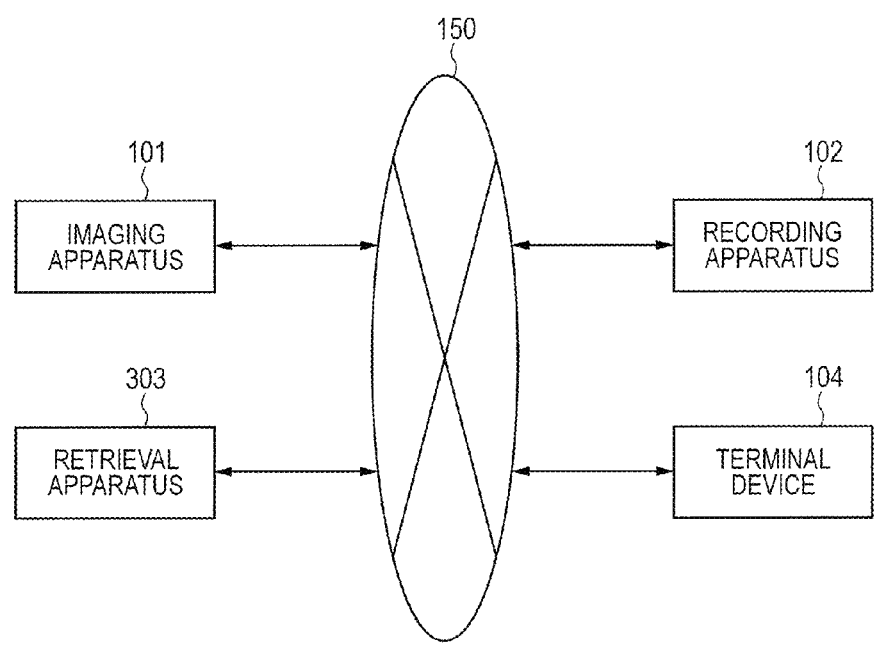
FIG. 3 is the configuration of a similar face image retrieval system according to a first embodiment including the present invention.

FIG. 3 is an exemplary device configuration of a similar face image retrieval system according to the first embodiment of the present invention. The system in FIG. 3 is configured in which an imaging apparatus 101, a recording apparatus 102, a retrieval apparatus 303, and a terminal device 104 are connected to a network 150 in the state in which the apparatuses and the device can communicate with one another. The device configuration in FIG. 3 is different from the device configuration in FIG. 1 in that the retrieval apparatus 303 is provided instead of the retrieval apparatus 103.

The retrieval apparatus 303 is a device including a similar image retrieval apparatus of a similar image retrieval system according to the present invention. The retrieval apparatus 303 is a device such as a server PC that detects a face in image data inputted through the network 150, records information about the face on a recording medium such as a HDD, retrieves information about the face recorded on the recording medium in response to a request from an external device, and outputs the search result to the network 150. Although the retrieval apparatus 303 and the terminal device 104 are assumed as external devices, for example, external devices include any devices that can communicate with the retrieval apparatus 303 through the network 150 or that are directly connected through other interfaces.

Figure 4:
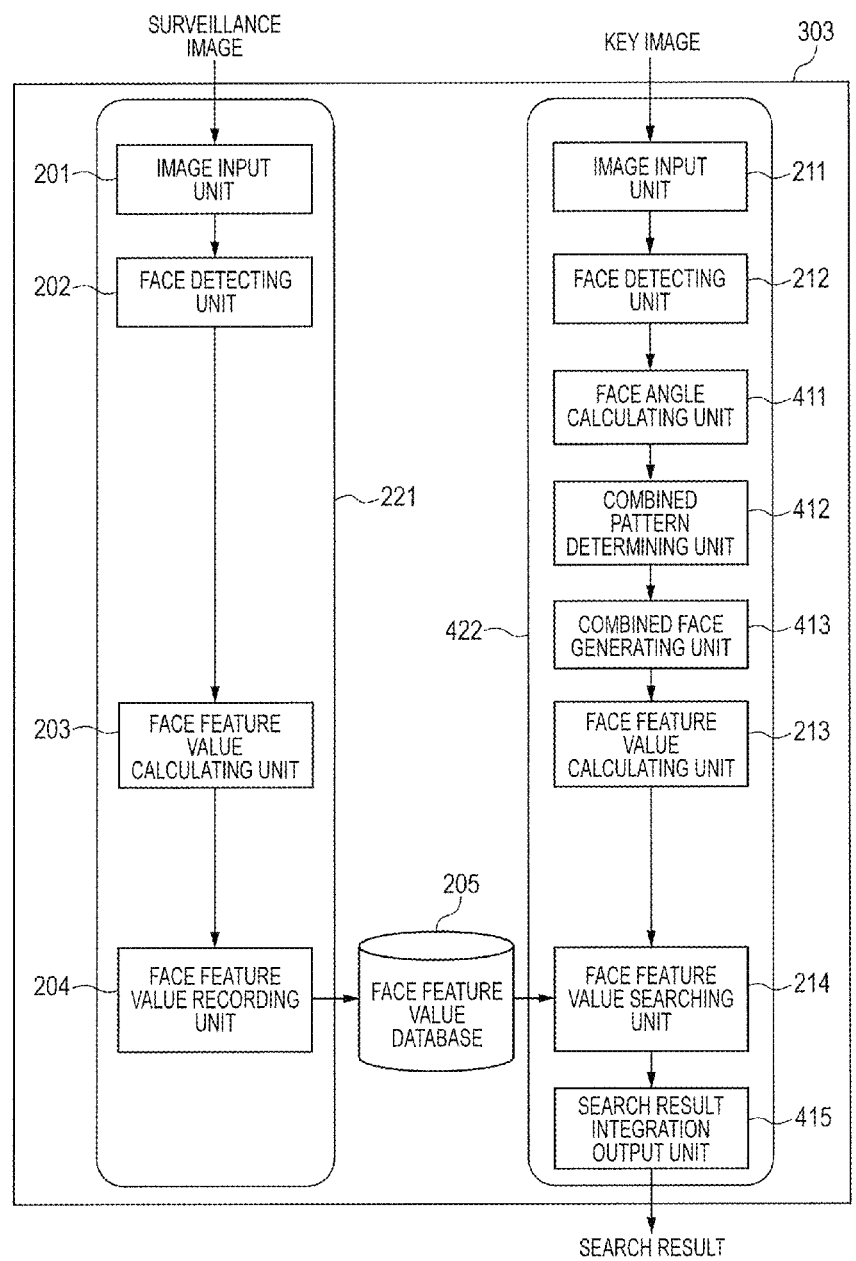
FIG. 4 is the configuration of a retrieval apparatus 303 according to the first embodiment.

FIG. 4 is an exemplary configuration of the retrieval apparatus 303 according to the first embodiment of the present invention.

The retrieval apparatus 303 is configured of a face registration processing group 221, a face retrieval processing group 422, and a face feature value database 205. Moreover, the face retrieval processing group 422 is configured of an image input unit 211, a face detecting unit 212, a face angle calculating unit 411, a combined pattern determining unit 412, a combined face generating unit 413, a face feature value calculating unit 213, a face feature value recording unit 214, and a search result integration output unit 415.

Figure 2:
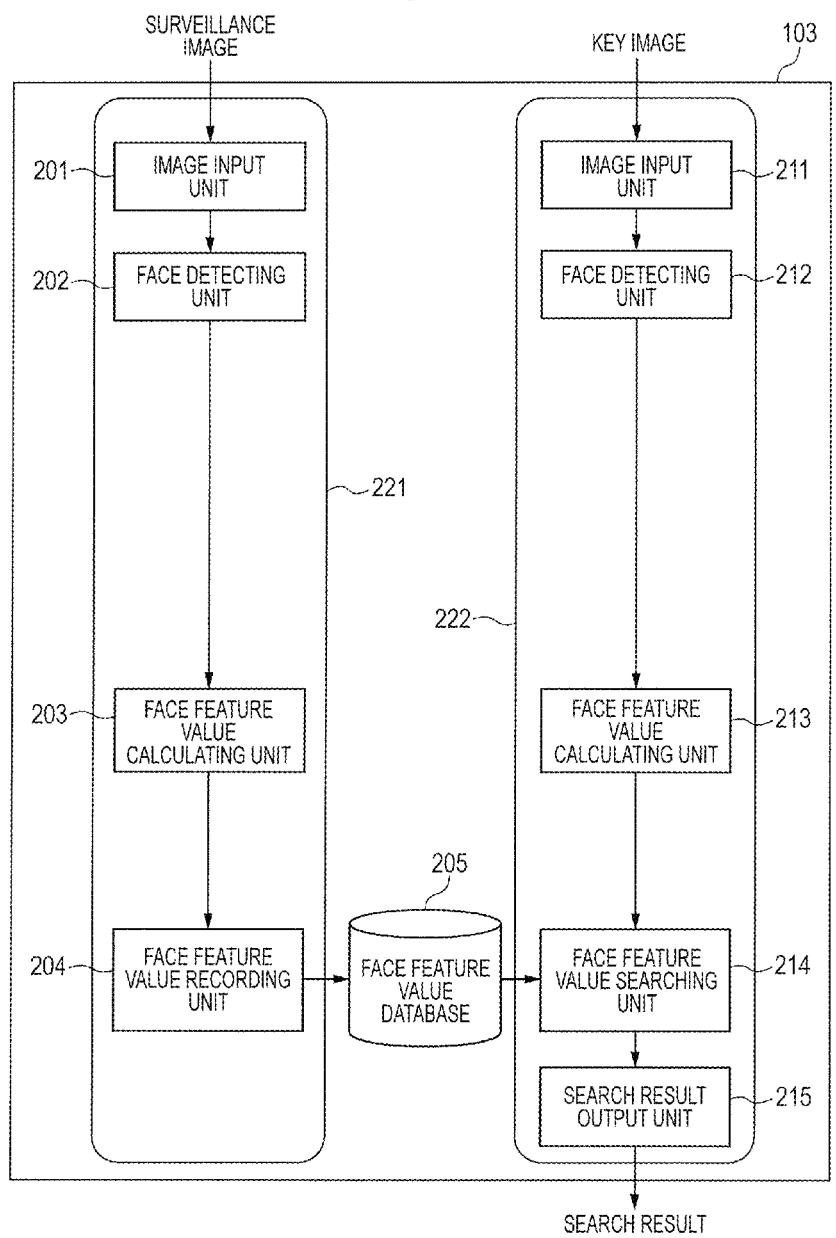
FIG. 2 is an exemplary configuration of a previously existing retrieval apparatus.

In FIG. 4, the process at the face registration processing group 221 is as described in FIG. 2.

Moreover, the process at the face retrieval processing group 422 is the same as the process at the face retrieval processing group 222 in FIG. 2 except that the face angle calculating unit 411, the combined pattern determining unit 412, and the combined face generating unit 413 are additionally provided.

The face angle calculating unit 411 calculates a face angle using at least one face detection result inputted from the face detecting unit 212, and outputs the face angle as a face angle calculation result. The face angle calculation result referred here is configured to include at least one set of the face angles of the inputted face (in other words, angles in the horizontal direction, the vertical direction, and the rotation direction) and probabilities of the face angles.

The inside of the face angle calculating unit 411 in this example is configured of a face angle feature value calculating unit 416, a face angle feature value database 417, and a face angle feature value searching unit 418. The face angle feature value database 417 in advance stores the face angles of face angle feature values that are found with respect to various angles of various faces.

The face angle feature value calculating unit 416 first calculates a feature value necessary to calculate a face angle from a face image included in the inputted face detection result. The feature value to be calculated here is a feature value that a difference occurs depending on the orientation of a face such as the relative position of eyes and a mouth with respect to the center of gravity of a face, a distance between eyes, and a distance between a larmier and a mouth, for example, (in the following, "the orientation of a face" is described as "the face orientation").

Subsequently, the face angle feature value searching unit 418 checks the face angle feature value calculated at the face angle feature value calculating unit 416 against the face angle feature value database 417 to find a few face angles having close feature values, and considers the distance between the feature values and the feature value of the inputted image, that is, the similarity to be the probability degree of the face angle. The face angle feature value searching unit 418 then outputs the face angles and the probability degrees to the combined pattern determining unit 412 as the face angle calculation result together with the inputted face image data and the like. It is noted that although the number of face angles included in the output may be a predetermined number, it is fine that face angles are narrowed down to the number of face angles having a plurality of feature values within a distance that the shortest distance to the feature value of the inputted image is multiplied by a given number.

It is noted that it may be fine that the face angle calculating unit 411 obtains a numeric value directly expressing a face angle using the joint Haar-like feature, for example, not using the face angle feature value database 417. Moreover, it may be fine that when the face detecting unit 212 includes a corresponding Haar-like discriminator, the value of the discriminator is used, or that the face angle calculating unit 411 itself is incorporated in the face detecting unit 212.

The combined pattern determining unit 412 uses the face angle calculation result inputted from the face angle calculating unit 411, and determines combined patterns to generate combined faces so as to provide a predetermined number of a plurality of target combined face angles. The combined pattern is a set of target combined face angles and deformation models necessary for combination. The deformation model is a model that simulates viewpoint conversion in a three-dimensional space on a two-dimensional image, and is expressed by an aggregation (a two-dimensional array) of deformation vectors (the motion vectors of a pixel of interest on a face image caused by changing a face angle). The deformation models are found and held in advance for the number of combinations of face angles before combined and target combined face angles by machine learning, for example.

Figure 5:
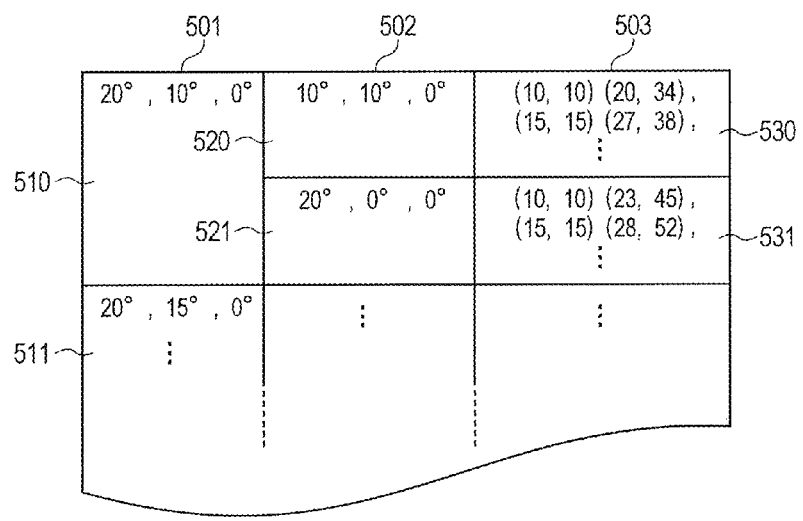
FIG. 5 is an example that face angles before combined, target combined face angles, and deformation models are stored in a table form.

FIG. 5 is an example that deformation models and target combined face angles are stored in a table form. A left column 501 is a set of fields that stores face angles before combined. A field 510 stores data expressing that the face angle before combined is at a horizontal angle of 20 degrees, a vertical angle of 10 degrees, and a rotation angle of zero degree. A field 511 below expresses that the face angle before combined is at a horizontal angle of 20 degrees, a vertical angle of 15 degrees, and a rotation angle of zero degree. A column 502 in the center is a set of fields that stores target combined face angles. A field 520 stores data expressing that the target combined face angle is at a horizontal angle of 10 degrees, a vertical angle of 10 degrees, and a rotation angle of zero degree. Moreover, a field 521 stores data expressing that the target combined face angle is at a horizontal angle of 20 degrees, a vertical angle of zero degree, and a rotation angle of zero degree.

In the example in FIG. 5, two target combined face angles are stored for a single face angle before combined. However, practically, it may be fine that two or more of a large number of the target combined face angles can be stored. The number of target combined face angles and angle values to be stored are determined for a balance with retrieval accuracy. However, suppose that the horizontal angle, the vertical angle, and the rotation angle take three values each, for example, $3^3-1=26$ target combined face angles are necessary. The reason why one is subtracted is that it is unnecessary to use the deformation model at the target combined face angle the same as the face angle before combined. A right column 503 is a set of fields that stores deformation models. A field 530 stores a set of deformation vectors. The example in FIG. 5 is an example of a set of vectors that a face at a horizontal angle of 20 degrees, a vertical angle of 10 degrees, and a rotation angle of zero degree is deformed into a face at a horizontal angle of 10 degrees, a vertical angle of 10 degrees, and a rotation angle of zero degree. Similarly, the field 531 is an example of a set of vectors that a face at a horizontal angle of 20 degrees, a vertical angle of 10 degrees, and a rotation angle of zero degree is deformed into a face at a horizontal angle of 20 degrees, a vertical angle of zero degree, and a rotation angle of zero degree. As described above, the fields belonging to the column 502 correspond to the fields belonging to the column 503 by one to one in the same row.

The combined pattern determining unit 412 reads all the combined patterns that are sets of the target combined face angles and the deformation models using the number of face angles included in the inputted face angle calculation result as an argument. However, the combined pattern determining unit 412 repeats the process for the number of times the same as the number of face angles included in the face angle calculation result inputted from the face angle calculating unit 411, and outputs the combined patterns to the combined face generating unit 413 in addition to the face angle calculation result from the face angle calculating unit 411.

The combined face generating unit 413 generates a combined face image according to the combined patterns inputted from the combined pattern determining unit 412. The generation of the combined face is achieved by moving the pixels of the original face image according to the deformation vectors included in the deformation model. The combined face generating unit 413 repeats the process for the number of times the same as the number of the inputted combined patterns. The combined face generating unit 413 outputs one or more of the combined face images thus generated to the face feature value calculating unit 213 in addition to information from the combined pattern determining unit 412.

The face feature value calculating unit 213 calculates feature face values from one or more of the combined face images inputted from the combined face generating unit 413 and the original face image. Here, the face feature values calculated at the face feature value calculating unit 213 and the calculating method are the same as ones at the face feature value calculating unit 203. It may be fine that two or more of combined face images are generated without using the original face image. The face feature value calculating unit 213 repeats the process for the number of inputted faces. The face feature value calculating unit 213 outputs two or more of face feature values thus calculated to the face feature value searching unit 214.

The face feature value searching unit 214 searches the face feature value database 205 using a plurality of the face feature values inputted from the face feature value calculating unit 213 as queries. In other words, one of the inputted face feature values is checked against the face feature value database 205 to extract faces of high face similarity, and outputs a list that the faces are sorted in order of similarity as a search result. The face similarity is the same as the face similarity described in FIG. 2. The search result includes the face feature values read out of the face feature value database 205 and the image data or the like in addition to the similarities. The process is repeated for the number of times the same as the number of the inputted face feature values.

The face feature value searching unit 214 outputs one or more of the calculated search results to the search result integration output unit 415.

The search result integration output unit 415 integrates two or more of the search results inputted from the face feature value searching unit 214, and outputs the integrated search result to the terminal device 104. The search result integration output unit 415 integrates the search results by merging the individual search results into one search result in order of the face images having higher similarity.

Next, a face registration process and a face retrieval process performed at the retrieval apparatus 303 according to the embodiment will be described with reference to FIGS. 4, 6, and 7.

The process at the retrieval apparatus 303 is formed of mainly two process sequences, "a face registration process" and "a face retrieval process". The face registration process is a process sequence performed at the processing unit group 221 in FIG. 4, and the face retrieval process is a process sequence performed at the processing group 422 in FIG. 4. The face registration process and the face retrieval process are operated asynchronously as the face feature value database 205 is shared.

Figure 6:
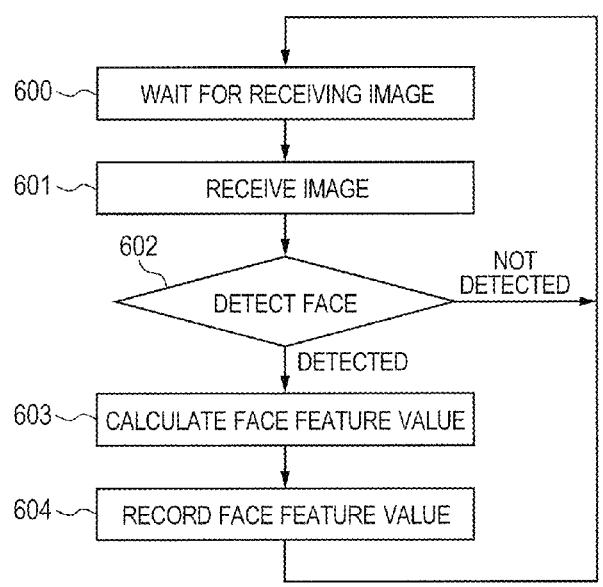
FIG. 6 is a flow of a face registration process according to the first embodiment.

FIG. 6 is a flow of the face registration process performed at the retrieval apparatus 303. The face registration process includes communications between the imaging apparatus 101 or the recording apparatus 102 and the retrieval apparatus 303. The retrieval apparatus 303 performs the face registration process as the arrival of a surveillance image from the imaging apparatus 101 or the recording apparatus 102 is a trigger.

In Step 600, the image input unit 201 waits for the arrival of a surveillance image (the image input unit 201 waits for receiving an image). For example, the image input unit 201 periodically accesses a stream input buffer, for example, and cheeks whether a surveillance image is inputted. In the case where the image input unit 201 then detects the input of a surveillance image, the process goes to the process in Step 601.

In Step 601, the image input unit 201 receives reception data from the imaging apparatus 101 or the recording apparatus 102. The reception data is formed to include attribute information data such as a shot time instant and an imaging apparatus number in addition to image data, and the image input unit 201 decodes a compressed image to obtain image data as necessary.

Subsequently, in Step 602, the face detecting unit 202 detects a face on the received image data by a publicly known method. In the case where at least one or more of faces are detected, the process in Step 603 is performed, whereas in the case where no face is detected, the process returns to the process in Step 600.

In Step 603, the face feature value calculating unit 203 calculates a face feature value individually for the face images included in the face detection result in Step 602.

In Step 604, the face feature value recording unit 204 records the face feature values on the feature value database 205 together with the image data and the face detection result. In the recording, it may be fine that the attribute information data received in Step 601 is together recorded. After the completion of recording, the process returns to the process in Step 600.

Figure 7:
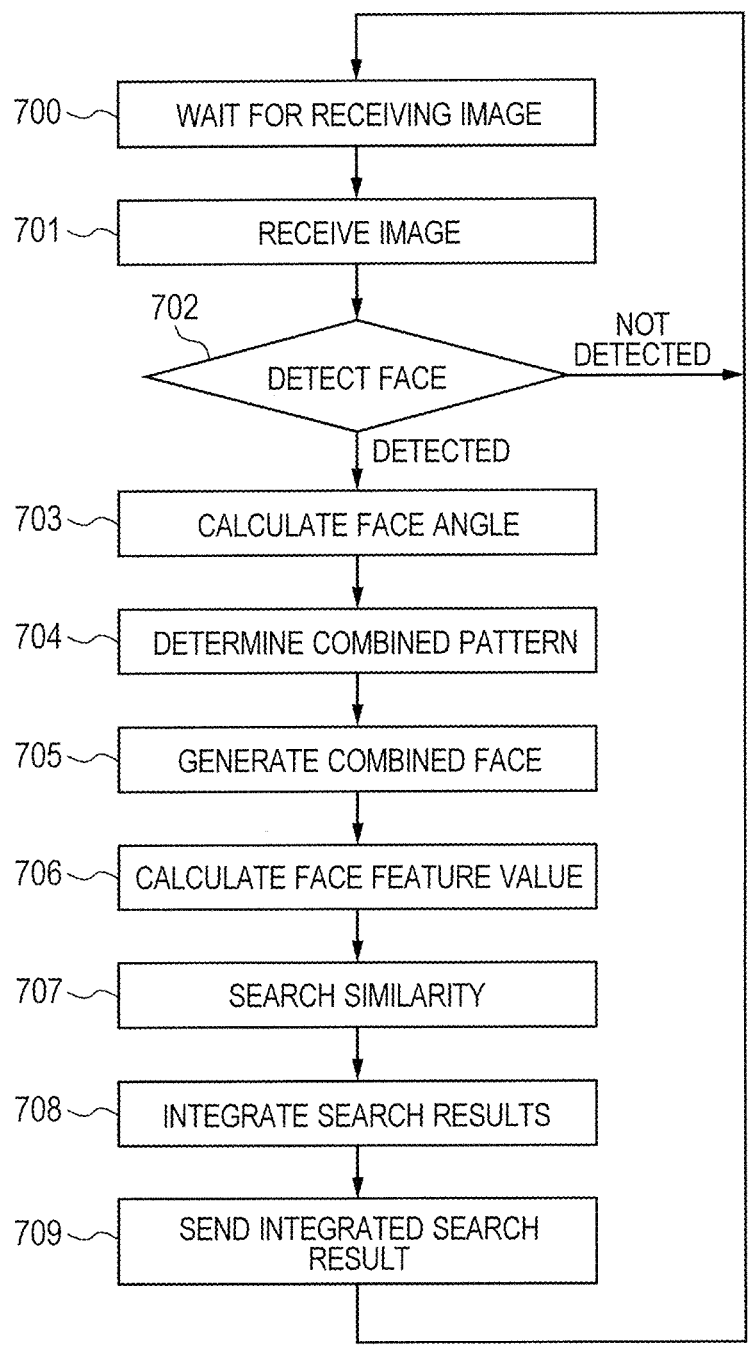
FIG. 7 is a flow of a face retrieval process according to the first embodiment.

FIG. 7 is a flow of the face retrieval process performed at the retrieval apparatus 303. The face retrieval process includes communications between the terminal device 104 and the retrieval apparatus 30. The retrieval apparatus 303 performs the face retrieval process as the arrival of a search request from the terminal device 104, that is, the arrival of a key image is a trigger.

In Step 700, the image input unit 211 waits for receiving a key image from the terminal device 104 (the image input unit 211 waits for receiving a key image). In other words, the image input unit 211 detects whether a key image is inputted from the terminal device 104. In the case where the image input unit 211 then detects the input of a key image, the process goes to the process in Step 701. Moreover, in the case where the input of a key image is not detected, the process in Step 700 is again performed after a lapse of a predetermined time period.

In Step 701, the image input unit 211 of the retrieval apparatus receives reception data such as a key image from the terminal device 104. The reception data is formed to include parameter data for narrowing search such as the time instants at which images are shot for a desired search area and an imaging apparatus number in addition to the image data.

Subsequently, in Step 702, the face detecting unit 212 detects a face on the received image data. In the case where at least one or more of faces are detected, the process in Step 703 is performed, whereas in the case where no face is detected, a message expressing that no face is detected is sent to the terminal device 104, and the process returns to the process in Step 700.

In Step 703, the face angle calculating unit 411 calculates a face angle on the face image included in the face detection result in Step 702.

In Step 704, the combined pattern determining unit 412 determines a combined pattern using the face angle calculation result in Step 703.

In Step 705, the combined face generating unit 513 generates a combined face according to the combined pattern determined in Step 704.

In Step 706, the face feature value calculating unit 213 calculates a feature value of the combined face image combined in Step 705.

In Step 707, the face feature value searching unit 214 searches the face feature value database 205 for similarity using the face feature value calculated in Step 706.

In Step 708, the search result integration output unit 415 integrates a plurality of inputted search results by repeating the processes in Steps 705 to 707.

In Step 709, the search result integration output unit 415 outputs the integrated search result to the terminal device 104. After the completion of transmission, the process returns to the process in Step 700.

FIG. 8 schematically illustrates the calculating method for the face feature value cited from Patent Literature 1 and also used at the face feature value calculating unit 203 in this example. In the calculating method, first, the resolution of the inputted image is multiplexed. For example, Gaussian blur and pixel decimation are alternately applied to the inputted image (in this example, the face image from the face detecting unit 202) for a plurality of times, and an image group 402a of a low resolution is obtained, which is also referred to as a Gaussian pyramid. This is performed for preventing the feature value from being easily affected by the resolution of the inputted image. Since the face image in this example is an image that the region of a face taken in a given size is cut out, the face image is scaled up or down to fit to a predetermined size prior to multiplexing resolution.

Subsequently, the image group 402a is split into regions to obtain an image group 402b. The regions split here are common in images in different resolutions.

Subsequently, the split regions are further split into small blocks in the size of three pixels by three pixels, the edge patterns of the pixel values of the small blocks are found, and the number of edge patterns that appear is counted. A few tens of predetermined patterns 402c are prepared for the edge patterns, and the number of times of matches of the edge patterns with the small blocks is a frequency 402d. Several thousand dimensional vectors including the elements of all the frequencies 402d of all the small blocks of the image group 402b thus calculated are the origin of the feature value. Practically, a feature value that the origin feature value is multiplied by a predetermined matrix (desirably a sparse matrix) to provide lower dimensional vectors is used for a feature value. The matrix is obtained by a scheme such as PCA (Principal Component Analysis) and LDA (Linear Discriminant Analysis).

Second Embodiment

In the similar image retrieval system according to the first embodiment, searches are repeated for the number of the combined patterns determined at the combined pattern determining unit 412 in the inside.

A second embodiment described below is an embodiment that improves a problem of the number of times of searches by sorting face feature values according to face angles for registration in databases. The configuration of a similar face image retrieval system according to the second embodiment including the present invention is the same as the first embodiment except that a retrieval apparatus 803 is provided instead of the retrieval apparatus 303.

Figure 9:
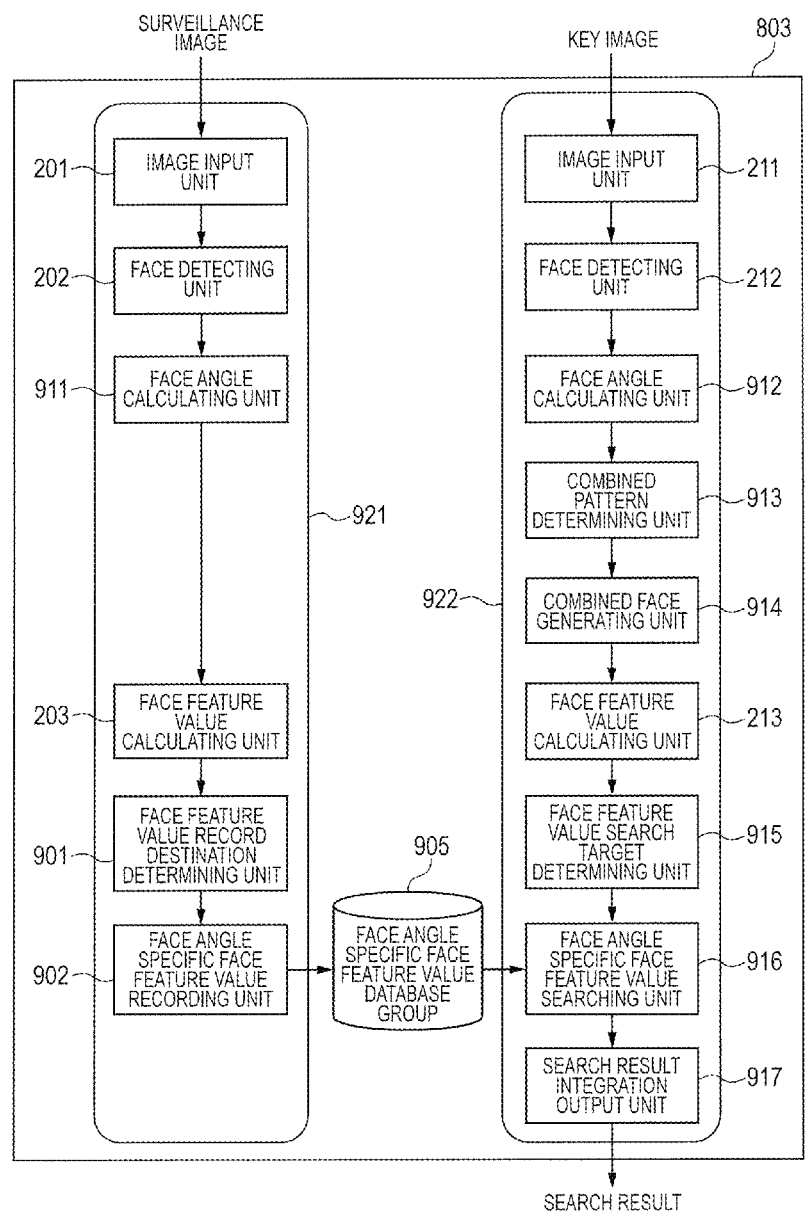
FIG. 9 is the configuration of a retrieval apparatus 803 according to a second embodiment.

FIG. 9 is an exemplary configuration of the retrieval apparatus 803 according to the second embodiment.

The retrieval apparatus 803 is configured of a face registration processing group 921, a face retrieval processing group 922, and a face angle specific face feature value database group 905. The face registration processing group 921 is configured of an image input unit 201, a face detecting unit 202, a face angle calculating unit 911, a face feature value calculating unit 203, a face feature value record destination determining unit 901, and a face angle specific face feature value recording unit 902. Moreover, the face retrieval processing group 922 is configured of an image input unit 211, a face detecting unit 212, a face angle calculating unit 912, a combined pattern determining unit 913, a combined face generating unit 914, a face feature value calculating unit 213, a face feature value search target determining unit 915, a face angle specific face feature value searching unit 916, and a search result integration output unit 917.

In the face registration processing group 921, the image input unit 201 and the face detecting unit 202 are the same as ones in FIG. 2 or FIG. 4. However, in the embodiment, the face detecting unit 202 outputs the detected face detection result to the face angle calculating unit 911 together with image data.

The face angle calculating unit 911 calculates a face angle using the face detection result inputted from the face detecting unit 202. The face angle calculation result is configured to include at least one or more of sets of the face angles of the inputted faces (in other words, angles in the horizontal direction, the vertical direction, and the rotation direction) and the probability degrees of the face angles. The face angle calculating unit 911 may be the same as the face angle calculating unit 411 according to the first embodiment. However, a smaller processing amount may be fine because the face angle calculating unit 911 is operated more frequently by the number of faces included in the inputted image. The face angle is not necessarily three-dimensional values, and the output values of four or more of determination devices may be used as they are.

The face feature value calculating unit 203 calculates the feature value of the face using the face image included in the face angle detection result inputted from the face angle calculating unit 911. The face feature value referred here is the same as the face feature value described in FIGS. 2 and 4. The face feature value calculating unit 203 outputs the calculated face feature value to the face feature value record destination determining unit 901 together with the image data, the face detection result, and the face angle calculation result.

The face feature value record destination determining unit 901 determines a record destination in the face angle specific face feature value database group 905 using the face angle calculation result together with the face feature value inputted from the face feature value calculating unit 203. The processing unit repeats the process according to the number of faces detected in the inputted face detection result (the number of times the same as the number of faces detected in the detection result, for example). The face feature value record destination determining unit 901 outputs the record destination information determined here to the face angle specific face feature value recording unit 902 together with the image data, the face detection result, the face angle calculation result, and the face feature values.

The face angle specific face feature value recording unit 902 writes the image data, the face detection result, the face angle calculation result, and the face feature values to the face angle specific face feature value database group 905 based on the record destination information inputted from the face feature value record destination determining unit 901. The processing unit repeats the process according to (for the number of times the same as the number of faces detected in the inputted face detection result, for example). It is noted that the face angle specific face feature value database group 905 is formed of databases that the face feature value database 205 is separated and isolated for the individual face angles.

Subsequently, in the process at the face retrieval processing group 922, the processes at the image input unit 211 and the face detecting unit 212 are almost the same as the processes described in FIGS. 2 and 4. However, in the embodiment, the face detecting unit 212 outputs the calculated face detection result to the face angle calculating unit 912 together with the image data.

The face angle calculating unit 912 calculates face angles using the face detection result inputted from the face detecting unit 212, and outputs the face angles as the face angle calculation result. The content of the face angle calculation result calculated here and the calculating method are the same as ones in the face angle calculating unit 911. Therefore, the face angle calculating unit 912 has the same configuration as the configuration of the face angle calculating unit 911 and is similarly operated. Moreover, the face angle calculating unit 912 is formed of the face angle feature value calculating unit, the face angle feature value database, and the face angle feature value searching unit, and information similar to information in the face angle calculating unit 911 is stored in advance also on the face angle feature value database. The face angle calculating unit 912 then outputs the calculated face angle calculation result to the combined pattern determining unit 913 together with the image data and the face detection result. The number of face angles included in the output may be a predetermined number of face angles, may be all of candidates falling in the range using a certain similarity for a threshold, or may be a combination of both. Furthermore, although the similarity here is applied in a feature value space different from the feature value space for the similarity described in the face feature value searching unit 214, the calculating method is the same.

The combined pattern determining unit 913 determines combined patterns to generate combined faces using the face angle calculation result inputted from the face angle calculating unit 912. The combined patterns determined at the combined pattern determining unit 913 are the same as the content described in the combined pattern determining unit 412 in FIG. 4. In addition, it is fine that the embodiment in which the deformation model and the target combined face angle are stored is the same as in FIG. 5. However, the device that in advance stores the deformation models and the target combined face angles is the face angle specific face feature value database group 905, not the face feature value database 205. The combined pattern determining unit 913 repeats the process for the number of times the same as the number of face angles included in the face angle calculation result inputted from the face angle calculating unit 912. The combined pattern determining unit 913 then outputs the combined patterns determined here to the combined face generating unit 914 together with the image data, the face detection result, and the face angle calculation result.

The combined face generating unit 914 generates a combined face image (see FIG. 4) according to the combined patterns inputted from the combined pattern determining unit 913. The combined face generating unit 914 outputs one or more of the generated combined face images to the face feature value calculating unit 213 together with the image data, the face detection result, and the face angle calculation result.

The process at the face feature value calculating unit 213 is as described in FIG. 4. However, the face feature value calculating unit 213 outputs one or more of the calculated face feature values to the face feature value search target determining unit 915.

The face feature value search target determining unit 915 determines a search target in the face angle specific face feature value database group 905 using the face angle calculation result together with the face feature values inputted from the face feature value calculating unit 213. The processing unit repeats the process according to (the number of times the same as the number of the inputted face feature values, for example). The face feature value search target determining unit 915 outputs search target information determined here to the face angle specific face feature value searching unit 916 together with the image data, the face detection result, the face angle calculation result, and the face feature values.

The face angle specific face feature value searching unit 916 checks one or more of face feature values inputted from the face feature value search target determining unit 915 against the face feature value database in the face angle specific face feature value database group 905, makes a list of faces with high face similarity, and outputs one or more of search results to the search result integration output unit 917.

The search target in the face angle specific face feature value database group 905 is based on the record destination information inputted from the face feature value record destination determining unit 901. The similarity means a numeric value that expresses the proximity between face feature values, and a Euclidean distance in a multi-dimensional face feature value space is used, for example. For the calculating method for the similarity, reference is made to the techniques or the like disclosed in Non-patent Literature 1 and Patent Literature 3, for example. Here, the search result includes face feature values, similarities, image data, or the like. The processing unit repeats the process according to (the number of times the same as the number of the inputted face feature values, for example).

The search result integration output unit 917 integrates one or more of search results inputted from the face angle specific face feature value searching unit 916, and outputs the integrated search result to the terminal device 104.

The search result integration output unit 917 integrates the search results by merging the search results in order of higher similarities using the similarity of the face image included in the individual search results. The process sequences of the face registration process and the face retrieval process at the face registration processing group 921 and the face retrieval processing group 922 are illustrated similarly as in FIG. 4. The face registration process and the face retrieval process will be described later.

Figure 10:
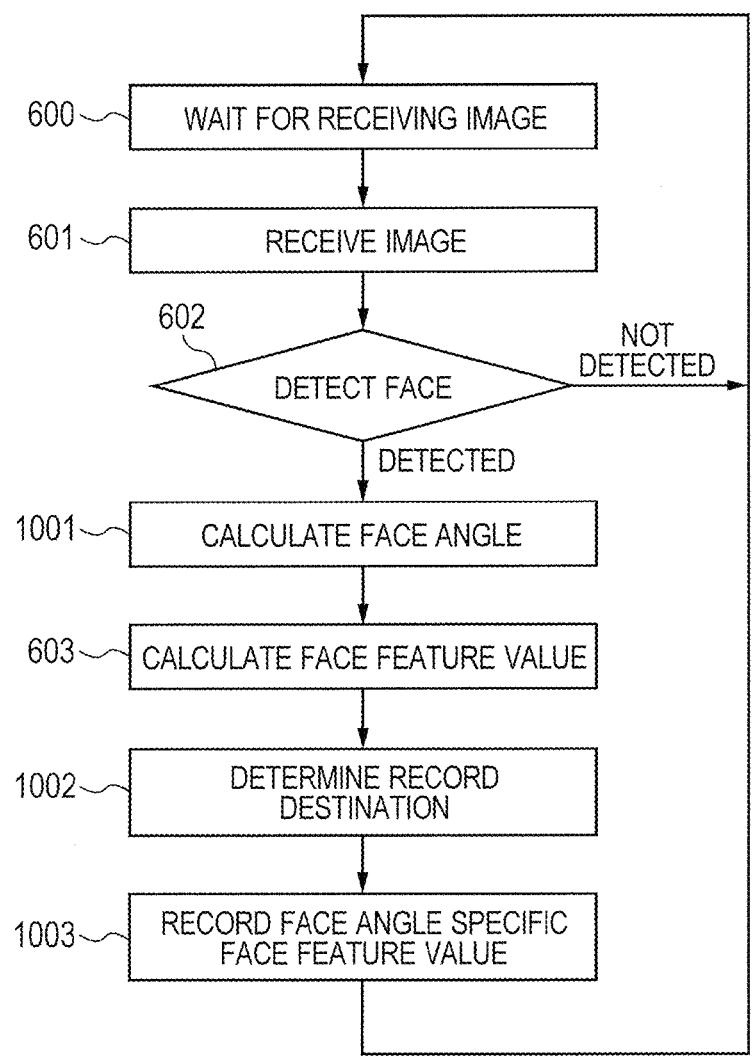
FIG. 10 is a flow of a face registration process according to the second embodiment.
Figure 11:
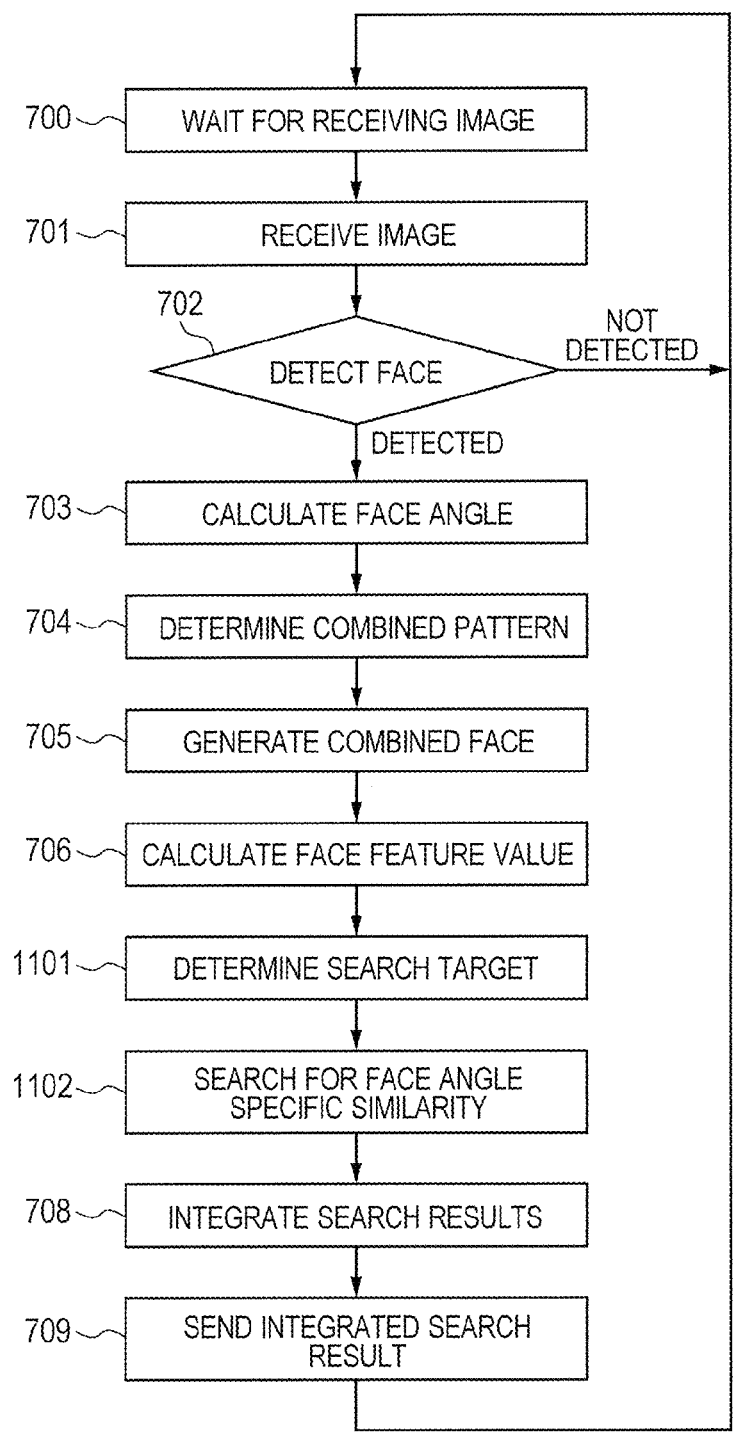
FIG. 11 is a flow of a face retrieval process according to the second embodiment.

Next, the face registration process and the face retrieval process performed at the retrieval apparatus 803 according to the present invention will be further described with reference to FIGS. 10, 11, and 9. The process at the retrieval apparatus 803 is mainly formed of two process sequences, "a face registration process" and "a face retrieval process". The face registration process is a process sequence performed at the processing unit group 921 in FIG. 9, and the face retrieval process is a process sequence performed at the processing group 922 in FIG. 9. The face registration process and the face retrieval process are formed independently as the face angle specific face feature value database group 905 is sandwiched, and can be asynchronously performed.

An embodiment of a flow of the face registration process according to the second embodiment including the present invention will be described with reference to FIG. 10. In FIG. 10, the steps having the same reference numerals and signs as the steps in FIG. 6 have process content similar to the first embodiment. The face registration process in FIG. 10 is performed by the process including communications between the imaging apparatus 101 and the retrieval apparatus 803, or between the recording apparatus 102 and the retrieval apparatus 803. The retrieval apparatus 803 performs the face registration process as the arrival of a surveillance image from the imaging apparatus 101 or the recording apparatus 102 is a trigger. Moreover, in the case where at least one or more of faces are detected in Step 602, the process in Step 1001 is performed.

In Step 1001, the face angle calculating unit 911 of the retrieval apparatus 803 calculates face angles on a face image included in the face detection result in Step 602. Although the repetition of the steps is not illustrated for making the description simple, in this step and in Steps 603, 1002, and 1003, the processes are repeated for the number of times the same as the number of faces detected in Step 602.

In the subsequent Step 603, the face feature value calculating unit 203 of the retrieval apparatus 803 calculates face feature values on the face image included in the face detection result in Step 602.

In the subsequent Step 1002, the face feature value record destination determining unit 901 of the retrieval apparatus 803 determines a record destination database in the face angle specific face feature value database group 905 according to the face angles found in Step 1001.

In Step 1003, the face angle specific face feature value recording unit 902 of the retrieval apparatus 803 then records the calculated face feature values on the record destination database in the face angle specific face feature value database group 905 together with the image data and the face detection result. In the recording, it may be fine that attribute information data inputted in Step 601 is also recorded. After the completion of recording, the process returns to the process in Step 600.

An embodiment of a flow of the face retrieval process according to the second embodiment including the present invention will be described with reference to FIG. 11. The face retrieval process is performed by the process including communications between the terminal device 104 and the retrieval apparatus 803. The retrieval apparatus 803 performs the face retrieval process as the arrival of a search request from the terminal device 104, that is, the arrival of a key image is a trigger. In FIG. 11, the steps having the same reference numerals and signs as the steps in FIG. 7 have the process content similar to the first embodiment. Therefore, the description of the processes in Steps 700 to 706 and in Steps 708 to 709 is omitted.

However, after the process in Step 706, the process in Step 1101 is performed. Moreover, after the process in Step 1102, the process in Step 708 is performed. Furthermore, the face angle calculating unit 912 is operated instead of the face angle calculating unit 411, the combined pattern unit 913 is operated instead of the combined pattern unit 412, and the combined face generating unit 013 is operated instead of the combined face generating unit 413.

In Step 1101, the face feature value search target determining unit 915 of the retrieval apparatus 803 then determines a search target database in the face angle specific face feature value database group 905 according to the face angles found in Step 703.

Subsequently, in Step 1002, the face angle specific face feature value searching unit 916 of the retrieval apparatus 803 searches the search target database found in Step 1001 for similarity using the calculated face feature values. It is noted that although the repetition of the steps is not illustrated for making the description simple, the process is repeated in Steps 705, 706, and 707 for the number of the combined patterns determined in Step 704.

In Step 708, similarly in FIG. 7, the search result integration output unit 415 of the retrieval apparatus 803 integrates a plurality of inputted search results by repeating the processes in Steps 705, 706, 1001, and 1002.

In Step 709, the search result integration output unit 415 of the retrieval apparatus 803 outputs the integrated search result to the terminal device 104. After the completion of transmission, the process returns to the process in Step 700.

In accordance with the similar image retrieval system according to the second embodiment described above, similarly to the first embodiment, the system is effective in improving retrieval accuracy for surveillance images that faces are often shot at various angles, and more reliable retrieval can be implemented. Moreover, a record destination is specified in recording face feature values, the face feature values are recorded on the database, and a search target in the database is specified in searching. Thus, a narrower search range can be set, so that a search time period can be shortened more than in the first embodiment.

Third Embodiment

In the following, a third embodiment will be described in which face angle calculation according to the first and the second embodiments described above is performed by a determination method in an interactive manner with a user in searching.

Figure 12:
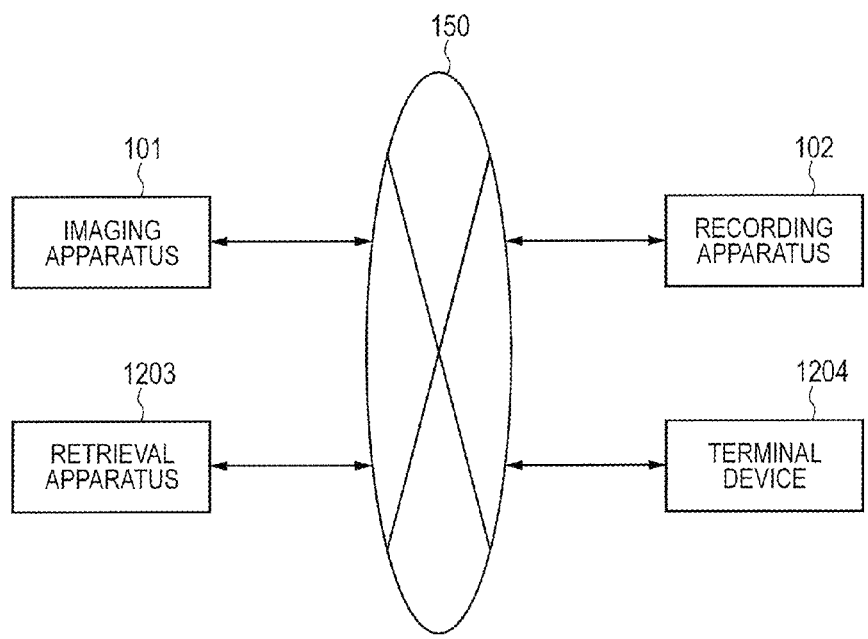
FIG. 12 is the configuration of a system including a similar face image retrieval function according to a third embodiment including the present invention.

FIG. 12 is a diagram of an exemplary configuration of a similar face image retrieval system according to the third embodiment including the present invention. The third embodiment is different from the first embodiment in that a retrieval apparatus 1203 is provided instead of the retrieval apparatus 303 and a terminal device 1204 is provided instead of the terminal device 104.

Figure 13:
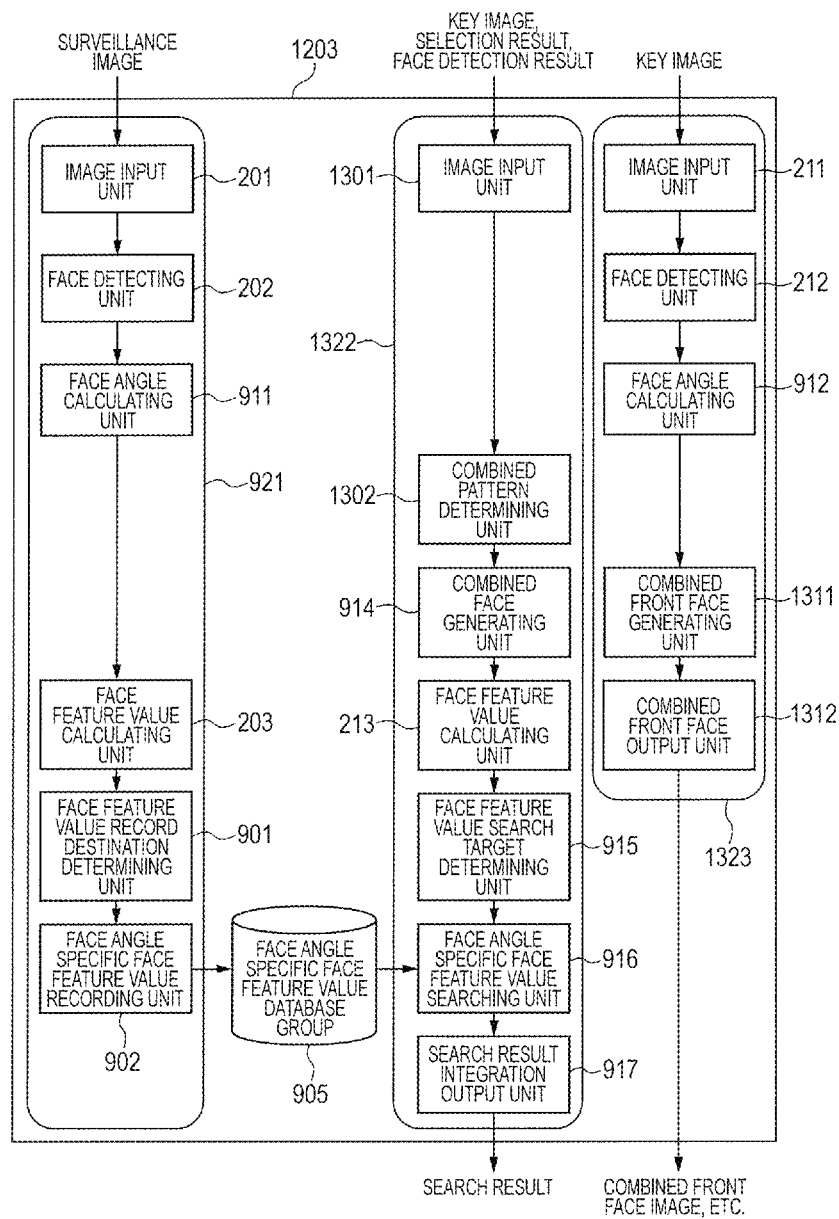
FIG. 13 is a flow of a face registration process according to the third embodiment.

FIG. 13 is the configuration of the retrieval apparatus 1203 according to the third embodiment. The retrieval apparatus 1203 is configured of a face registration processing group 921, a face retrieval processing group 1322, a front face image combination processing group 1323, and a face angle specific face feature value database group 905. The face retrieval processing group 1322 is configured of an image input unit 1301, a combined pattern determining unit 1302, a combined face generating unit 914, a face feature value calculating unit 213, a face feature value search target determining unit 915, a face angle specific face feature value searching unit 916, and a search result integration output unit 917.

The process at the face registration processing group 921 is as already described in FIG. 9. The front face image combination processing group 1323 is configured of an image input unit 211, a face detecting unit 212, a face angle calculating unit 912, a combined front face generating unit 1311, and a combined front face output unit 1312.

In the face retrieval processing group 1322, the image input unit 1301 receives search key image data inputted from the terminal device 1204. Data to be received (reception data) also includes selection result information and a face detection result in addition to the search key image data. The image input unit 1301 receives the reception data in the case where a request for search is made on the terminal device 1204 based on a search instruction manipulation made by the user. The image input unit 1301 outputs the received image data, the selection result information, and the face detection result to the combined pattern determining unit 1302.

The combined pattern determining unit 1302 determines combined patterns to generate combined faces using the selection result information inputted from the image input unit 1301. The determination method for the combined patterns at the combined pattern determining unit 1302 is the same as the method at the combined pattern determining unit 412. However, the face angles before combined used here are face angles included in the selection result information. The combined pattern determining unit 1302 outputs the combined patterns determined here to the combined face generating unit 914 together with the image data, the face detection result, and the face angle calculation result.

The combined face generating unit 914 generates a combined face image according to the combined patterns inputted from the combined pattern determining unit 1302, and outputs one or more of the generated combined face images to the face feature value calculating unit 213 together with the image data, the face detection result, and the face angle calculation result.

The operations of the combined face generating unit 914, the face feature value calculating unit 213, the face feature value search target determining unit 915, the face angle specific face feature value searching unit 916, and the search result integration output unit 917 are as described in FIG. 9. It is noted that the search result integration output unit 917 integrates the search results by merging the search results in order of higher similarities using the similarities of the face images included in the individual search results.

Subsequently, in the front face image combination processing group 1323, the operations of the image input unit 211, the face detecting unit 212, and the face angle calculating unit 912 are as described in FIG. 9. However, the face angle calculating unit 912 outputs the calculated face angle calculation result to the combined front face generating unit 1311 together with the image data and the face detection result.

The combined front face generating unit 1311 generates a combined front face based on the face angle calculation result inputted from the face angle calculating unit 912. The combined face is generated similarly to the combined face generating unit 914 using only a pattern that the target combined face angle is a front face, that is, a face at a horizontal angle of zero degree, a vertical angle of zero degree, and a rotation angle of zero degree in the combined patterns obtained by checking the face angle calculation result against FIG. 5. The processing unit repeats the process for four face angles at the maximum in order of higher probabilities at face angles included in the inputted face angle calculation result. The combined front face generating unit 1311 outputs one or more of the combined face images generated here to the combined front face output unit 1312 together with the image data, the face detection result, and the face angle calculation result.

The combined front face output unit 1312 outputs one or more of the combined front faces, the face detection result, and the face angle calculation result inputted from the combined front face generating unit 1311 to the terminal device 1204.

An embodiment of a screen displayed on the terminal device 1204 and user manipulations according to the third embodiment of the present invention will be described with reference to FIG. 14. FIG. 14 is a diagram of an embodiment of a screen displayed on the terminal device 1204 according to the third embodiment of the present invention.

In FIG. 14, the screen displayed on the terminal device 1204 is configured of a reproduction image display region 1400, an image reproduction manipulation region 1410, a search key image specification region 1420, a search narrowing parameter specification region 1430, a search execution region 1440, and a search result display region 1450.

In FIG. 14, the reproduction image display region 1400 is a region in which images inputted from the imaging apparatus 101 and the recording apparatus 102 to the terminal device 1204 through the network 150 are continuously displayed as a moving picture. On the reproduction image display region 1400, a moving picture 1401 is displayed, which inputted images are continuously displayed as a moving picture.

The image reproduction manipulation region 1410 is a region in which button figures are disposed for switching between the imaging apparatus 101 that is a picture input source and the recording apparatus 102 and for reproducing images recorded on the recording apparatus 102. Unique reproduction manipulation types are allocated to the buttons (the button figures) disposed in the region. For example, manipulation types "rewind", "reverse reproduction", "stop reproduction", "forward reproduction", and "fast forward" are allocated from the left buttons. The user manipulates a GUI and appropriately presses the buttons, and the moving picture 1401 is moved by the functions allocated to the button figures.

The search key image specification region 1420 is a region in which a search key image is specified and displayed. The region is configured of a search key image 1421, a specification button 1422, a combination button 1423, and select candidate image buttons 1424 to 1427, for example.

The search key image 1421 is a place that a search key image is displayed. Since the search key image is not specified in the initial state, the state is in which no image is displayed. Alternatively, it may be fine that an image separately prepared is displayed which expresses the state in which no image is specified in the initial state, or that a notation is provided which expresses that no image is specified.

The specification button 1422 is a button that specifies the image displayed on the moving picture 1401 as a search key image when the user manipulates the GUI and appropriately presses the button.

The combination button 1423 is a button that instructs face image combination on the search key image when pressed.

The select candidate image buttons 1424 to 1427 are places that a combined face image is displayed. The user selects a combined face image that a face is combined in the direct front, manipulates the GUI, and presses the button.

The search narrowing parameter specification region 1430 is a region in which the type and value (range) of a narrowing parameter in searching are specified. The region is configured of imaging apparatus specification check boxes 1431, 1432, 1433, and 1434, time instant specification check boxes 1435 and 1436, and time instant specification fields 1437 and 1438, or the like. The imaging apparatus specification check boxes 1431, 1432, 1433, and 1434 are buttons that specify an imaging apparatus to be a search target in searching. When the user presses the buttons, check marks expressing a selection are displayed. When the buttons are again pressed, the marks are not displayed, and the marks are switched between on display and not on display every time when pressed. The time instant specification check boxes 1435 and 1436 are buttons that specify the shot time instant range for a search target in searching. The forms of display of the buttons are also the same as the other check boxes.

For example, in the case where the time instant specification check box 1435 is turned into the selected state, a beginning time instant is given to the time instant range. In the case where the time instant specification check box 1435 is turned into the unselected state, no beginning time instant is given to the time instant range. In other words, in the case where no beginning time instant is given, it means that the search target range is extended to an image at the oldest time instant recorded on the recording apparatus. Similarly, in the case where the time instant specification check box 1436 is turned into the selected state, a tail end time instant is given to the time instant range. In the case where the time instant specification check box 1436 is turned into the unselected state, no tail end time instant is given to the time instant range. In other words, in the case where no tail end time instant is given, it means that the search target range is extended to an image at the newest time instant recorded on the recording apparatus. Moreover, for example, in the case where both of the time instant specification check box 1435 and the time instant specification check box 1436 are turned into the selected state, it means that the search target range is extended from the specified beginning time instant to the tail end time instant. The time instant specification fields 1437 and 1438 are input fields in which the values of the beginning time instant and the tail end time instant described above are specified. In other words, in the example in FIG. 14, the beginning time instant is 6/26/2009 15:30:20, and the tail end time instant is 7/13/2009 12:30:20.

The search execution region 1440 is a region in which the execution of search is instructed. The region is configured of a search button 1441. The search button 1441 is a button that instructs the execution of searching for a similar person using the search key image 1421. In the case where a parameter is specified on the search narrowing parameter specification region 1430, the execution is instructed as also including the content.

The search result display region 1450 is a region in which the search result is displayed. The search result is displayed by displaying search result images on a list. In the initial state, nothing is displayed on the search result display region. An example is shown on the search result display region 1450 in FIG. 14 that similar images are retrieved as search targets are images taken by a camera 1, a camera 2, and a camera 4 from 6/26/2009 15:30:20 to 7/13/2009 12:30:20. Search result images 1451 to 1457 are displayed in order of similarities with respect to the search key image from the left to the right on the topmost row and then the left to the right on the subsequent second row. The example shows that the search result image 1451 located on the left most side on the topmost row has the highest similarity with respect to the search key image 1421 and the search result image 1457 has the lowest similarity.

A cue replay button 1458 and a search key image specification button 1459 are provided around the search result image 1456. The other search result images 1451 to 1455 and 1457 also have the buttons.

The cue replay button is a button that instructs the start of continuous moving picture reproduction starting from the search result image. For example, the cue replay button 1458 is pressed down, and then the moving picture 1401 is switched to the search result image 1456. The search key image specification button is a button that specifies the search result image to the search key image. For example, the search key image specification button 1459 is pressed down, and then the search result image 1456 is displayed on 1421 as a search key image. Thus, the search result image is used to again perform search.

Figure 15A:
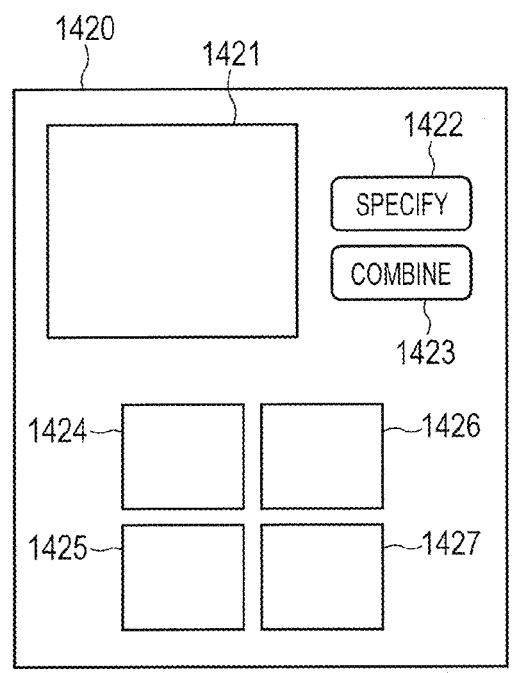
FIG. 15A is an enlarged diagram of a search key image specification region shown on the screen of the terminal device.
Figure 15B:
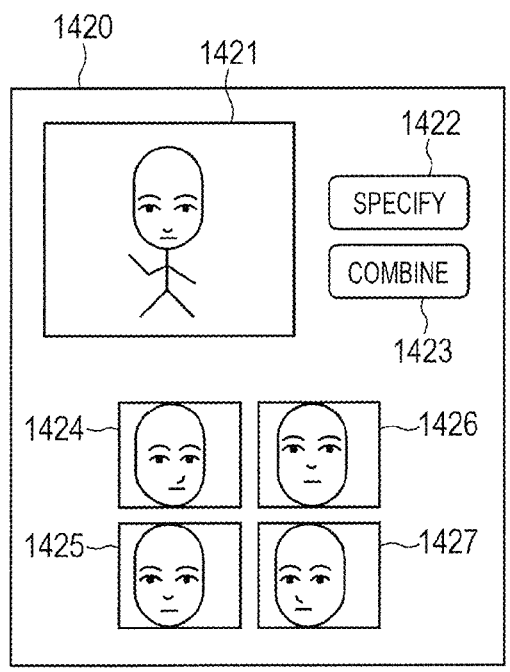
FIG. 15B is an enlarged diagram of a search key image specification region shown on the screen of the terminal device.
Figure 15C:
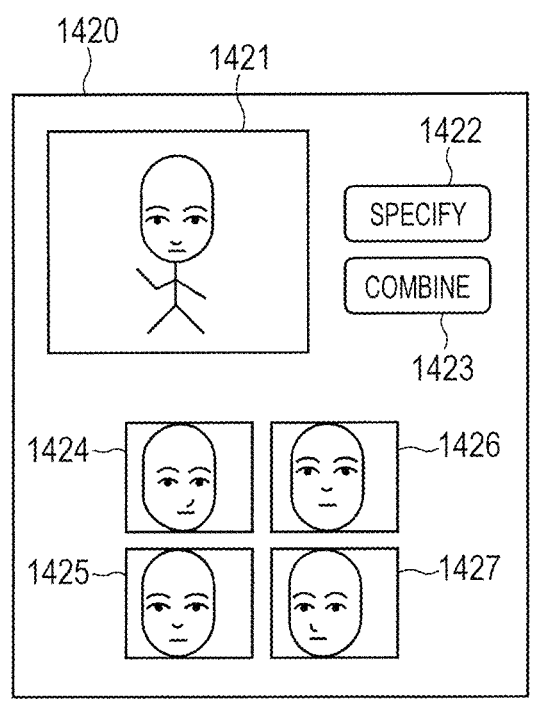
FIG. 15C is an enlarged diagram of a search key image specification region shown on the screen of the terminal device.
Figure 16:
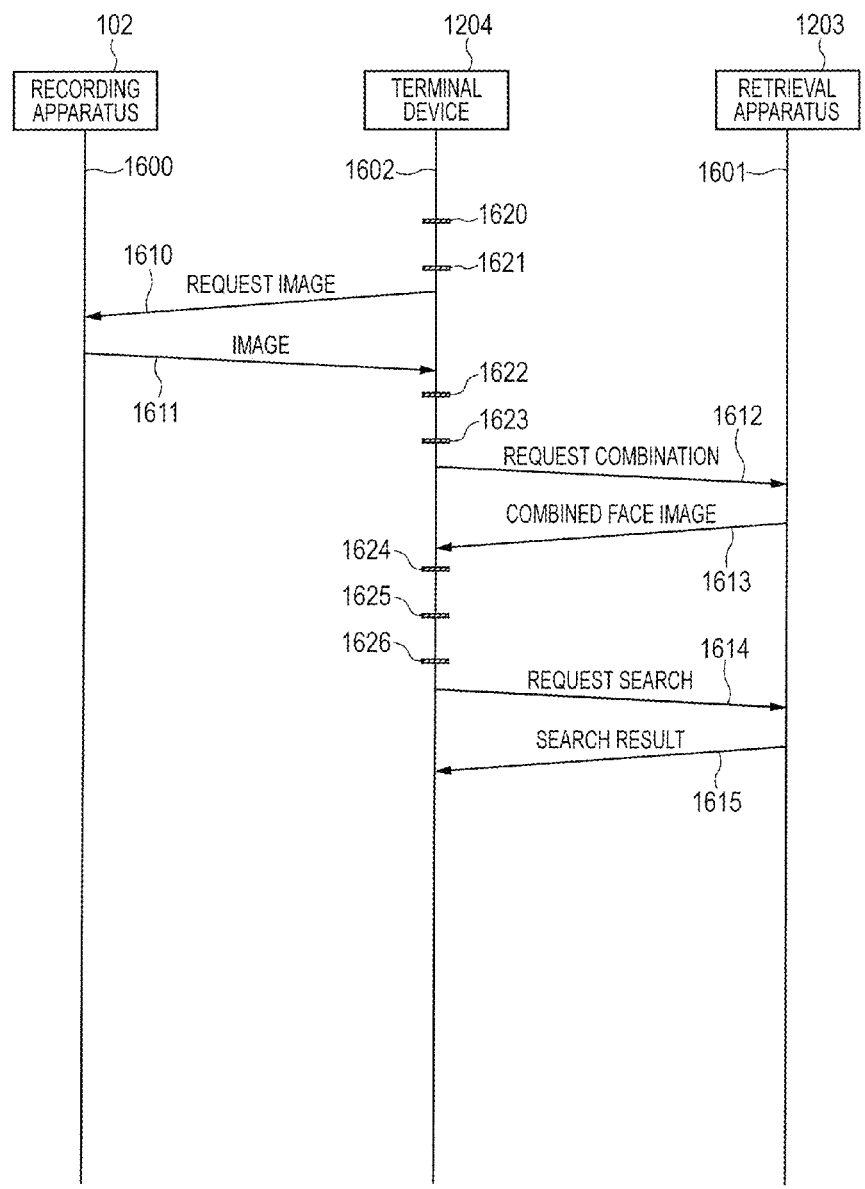
FIG. 16 is an exemplary communication sequence in the manipulation of specifying a search key image using a search key image specification region.

The manipulation related to the present invention is the manipulation of specifying a search key image starting from pressing the specification button 1422 for a picture in the manipulations on the screen. FIGS. 15A, 15B, and 15C are enlarged display of the search key image specification region 1420. FIG. 16 is a diagram of an exemplary communication sequence in the manipulation of specifying a search key image according to the present invention.

FIG. 16 is the order in a time series that time instants elapse from above to below on the paper (however, the length of time is not matched with the vertical length). The communication operation of the recording apparatus 102 (or the imaging apparatus 101) is displayed on a sequence 1600, the communication operation of the terminal device 1204 is displayed on a sequence 1602, and the communication operation of the retrieval apparatus 1203 is displayed on a sequence 1601. Moreover, timings 1620 to 1626 express the operation timings in a time series. Furthermore, communications 1610 to 1615 express main communications among the apparatuses and the device. The communications 1610 and 1611 are in the relationship between a request and a response. The same thing is applied to the communications 1612 and 1613 and the communication 1614 and 1615. It is noted that communications illustrated by the communications 1610 to 1615 are conceptual examples, and do not illustrate the specific forms of the communications.

FIG. 15A is an exemplary screen before specifying the search key image on the search key image specification region 1420 (at the timing 1620). Since no search key image is specified, the state is in which the search key image 1421 is not displayed. Moreover, the same thing is applied to the select candidate image buttons 1424 to 1427.

In FIG. 15A, the user presses the specification button 1422 at the time instant at the timing 1621, and then the screen of the terminal device 1204 is switched to the screen in FIG. 15B.

In other words, when the specification button 1422 is pressed down by a user manipulation, the terminal device 1204 outputs (sends) the communication 1610 to the recording apparatus 102 for requesting an image. The communication 161 is a communication for requesting a search key image. The recording apparatus 102 receives the communication 1610, and then outputs (delivers) the communication 1611 to the terminal device 1204. The communication 1611 is a communication including the search key image delivered in response to the request. The terminal device 1204 receives the communication 1610, and then displays the search key image included in the communication 1611 on the screen at the time instant at the timing 1622.

FIG. 15B is an exemplary screen after pressing the specification button 1422. The image presently displayed on the moving picture 1401 is displayed on the search key image 1421. In FIG. 15B, the user presses the combination button 1423 at the time instant at the timing 1623, and then the screen of the terminal device 1204 is switched to the screen in FIG. 15C. In other words, when the combination button 1423 is pressed down by a user manipulation, the terminal device 1204 outputs (sends) the communication 1612 for requesting combination to the retrieval apparatus 1203. The communication 1612 is a communication for requesting combination. The search key image acquired in the communication 1611 is also included in the communication 1612.

The retrieval apparatus 1203 receives the communication 1612, and then outputs (delivers) the communication 1613 to the terminal device 1204. The communication 1613 is a communication including one or more of the combined face images delivered in response to the request, the face detection result, and the face angle calculation result. The terminal device 1204 receives the communication 1613, and then displays the search key image included in the communication 1613 on the screen at the time instant at the timing 1624.

FIG. 15C is an exemplary screen after pressing the combination button 1423. A face image is displayed individually on the select candidate image buttons 1424 to 1427. Here, the face image displayed on the select candidate image button is a face image generated by combination. In FIG. 15C, the user selects and presses any one of the select candidate image buttons 1424 to 1427 at the time instant at the timing 1625. Here, the button to be selected is a button displaying a face image that is considered to be a face in the direct front among the displayed combined face images. In the example, the user presses the select candidate image button 1425.

Lastly, the user presses the search button 1441 at the time instant at the timing 1626. In other words, when the combination button 1423 is pressed down by a user manipulation, the terminal device 1204 outputs (sends) the communication 1614 for requesting search to the retrieval apparatus 1203. The communication 1614 is a communication for requesting search. The communication 1614 also includes information about the selection result by the user in FIG. 15(*c*), the search key image acquired in the communication 1611 or 1613, and the face detection result in addition to the search key image. The retrieval apparatus 1203 receives the communication 1614, makes a search based on the search key image included in the received communication 1614, and then outputs (delivers) the search result as the communication 1615 to the terminal device 1204. The terminal device 1204 receives the communication 1615, and then displays the search result on the search result display region 1450.

As described above, a series of the manipulations related to the region is finished.

In accordance with the similar image retrieval system according to the third embodiment described above, similarly to the first and the second embodiments, the similar image retrieval system is effective in improving retrieval accuracy for surveillance images that faces are often shot at various angles, and more reliable retrieval can be implemented. Moreover, in accordance with the similar image retrieval system according to the third embodiment described above, similarly to the second embodiment, a record destination is specified in recording face feature values, and the face feature values are recorded on the database, a search target in the database is specified in searching. Thus, a narrower search range can be set, so that a search time period can be shortened more than in the first embodiment. Furthermore, in accordance with the similar image retrieval system according to the third embodiment described above, face angle calculation can be determined in a user interactive manner with the user in searching, and operability is improved. In addition, the search conditions for face angle calculation can be changed appropriately, easily, and quickly according to the situations, so that more reliable retrieval can be implemented.

In the description of the foregoing first to the third embodiments, the configuration is shown in which a single imaging apparatus, a single recording apparatus, a single retrieval apparatus, and a single terminal device are provided, for simplifying the description. However, pluralities of the apparatuses and the devices can be connected to the network. Moreover, in the foregoing first to the third embodiments, the recording apparatus and the retrieval apparatus are described as separate apparatuses, for making the description simple. However, such a configuration may be fine that the recording apparatus and the retrieval apparatus are mounted on the same apparatus. Furthermore, similarly, such a configuration may be fine that the retrieval apparatus and the terminal device are mounted on a single apparatus.

In addition, in the third embodiment, an example is shown in which the manipulation of selecting a front face is completed by a single presentation and a single selection for simplifying the description. However, it may be fine that pluralities of presentations and selections are repeated.

Moreover, in the foregoing first to the third embodiments, similar image retrieval targeted for a face is shown. However, the embodiments are also applicable to similar image retrieval targeted for other objects such as a vehicle, not only for a face.

INDUSTRIAL APPLICABILITY

The present invention is applicable to systems that handle pictures such as people and vehicles taken on cameras including television program production systems and electronic photo albums for individuals in addition to CCTV (Closed-Circuit Television) systems, face authentication systems, and criminal databases, for example.

LIST OF REFERENCE SIGNS

101: imaging apparatus
102: recording apparatus
103: retrieval apparatus
104: terminal device
150: network
201: image input unit 202: face detecting unit
203: face feature value calculating unit
204: face feature value recording unit
205: face feature value database
211: image input unit
212: face detecting unit
213: face feature value calculating unit
214: face feature value searching unit
215: search result output unit
221: face registration processing group
222: face retrieval processing group
303: retrieval apparatus
411: face angle calculating unit
412: combined pattern determining unit
413: combined face generating unit
415: search result integration output unit
422: face retrieval processing group
501 to 503: column
510, 511, 520, 521, 530, and 531: field
803: retrieval apparatus, 901: face feature value record destination determining unit
902: face angle specific face feature value recording unit
905: face angle specific face feature value database group
911 and 912: face angle calculating unit
913: combined pattern determining unit
914: combined face generating unit
915: face feature value search target determining unit
916: face angle specific face feature value searching unit
917: search result integration output unit
1203: retrieval apparatus
1204: terminal device
1400: reproduction image display region
1401: moving picture
1410: image reproduction manipulation region
1420: search key image specification region
1421: search key image
1422: specification button
1423: combination button
1424 to 1427: select candidate image button
1430: search narrowing parameter specification region
1431, 1432, 1433, and 1434: imaging apparatus specification check box
1435 and 1436: time instant specification check box
1437 and 1438: time instant specification field
1440: search execution region
1450: search result display region

The invention claimed is:

1. A similar image retrieval system comprising:
a first image input unit configured to receive an input of a search target image; a first face detecting unit configured to detect a first face from the inputted search target image; a face feature value calculating unit configured to calculate a feature value of the detected first face; and a database recording unit configured to record the calculated face feature value;
a second image input unit configured to receive an input of a key image for search; a second face detecting unit configured to detect a second face from the inputted key image; a face angle calculating unit configured to calculate a face angle of the detected second face; a combined pattern determining unit configured to determine a combined pattern by the calculated face angle; a combined face generating unit configured to generate a combined face image according to the determined combined pattern; and a second face feature value calculating unit configured to calculate a feature value of the second face using the generated combined face image; and
a face feature value searching unit configured to repeat the combined face generating unit and the face feature value calculating unit according to a number of the determined combined patterns and search a database using a plurality of calculated face feature values as queries; and a search result integrating unit configured to integrate a plurality of retrieved search results.

2. A similar image retrieval system comprising:
a first image input unit configured to receive an input of a search target image; a first face detecting unit configured to detect a first face from the inputted search target image; a first face angle calculating unit configured to calculate a face angle of the detected first face; a first face feature value calculating unit configured to calculate a feature value of the detected first face; a record destination database determining unit configured to determine a record destination database according to the calculated face angle; and a database recording unit configured to record the calculated first face feature value on the determined record destination database;
a second image input unit configured to receive an input of a key image for search; a second face detecting unit configured to detect a second face from the inputted key image; a face angle calculating unit configured to calculate a face angle of the detected second face; a combined pattern determining unit configured to determine a combined pattern by the calculated face angle; a combined face generating unit configured to generate a combined face image according to the determined combined pattern; and a second face feature value calculating unit configured to calculate a feature value of the second face using the generated combined face image; and
a search target database determining unit configured to determine a search target database by the calculated face angle; a face feature value searching unit configured to perform the combined face generating unit, the second face feature value calculating unit, and the search target database determining unit for a plurality of times according to a number of the determined combined patterns and search the database using a plurality of calculated face feature values as queries; and a search result integrating unit configured to integrate a plurality of retrieved search results.

3. The similar image retrieval system according to claim 2, wherein the face angle calculating unit includes a face angle feature value calculating unit for an inputted face; a database that in advance stores a face angle feature value for a face at a known angle together with face angle information; and a face angle searching unit configured to search the database using a face angle feature value determined at the face angle feature value calculating unit as a query.

4. The similar image retrieval system according to claim 2, wherein the combined pattern determining unit uses a probability that is a calculated result at the face angle calculating unit, and also uses a face angle having a probability of a second candidate or later one.

* * * * *